United States Patent
Vida et al.

(10) Patent No.: US 10,579,228 B2
(45) Date of Patent: Mar. 3, 2020

(54) METHOD AND SYSTEM FOR CONFIGURING SELECTION OF CONTEXTUAL DASHBOARDS

(71) Applicant: Synacor, Inc., Buffalo, NY (US)

(72) Inventors: Gabor Vida, Ottawa (CA); Stephen Mackenzie, Ottawa (CA); Anthony Macdonnell, Ottawa (CA)

(73) Assignee: Synacor, Inc., Buffalo, NY (US)

( * ) Notice: Subject to any disclaimer, the term of this patent is extended or adjusted under 35 U.S.C. 154(b) by 465 days.

(21) Appl. No.: 14/760,353

(22) PCT Filed: Jan. 8, 2014

(86) PCT No.: PCT/CA2014/000001
§ 371 (c)(1),
(2) Date: Jul. 10, 2015

(87) PCT Pub. No.: WO2014/107793
PCT Pub. Date: Jul. 17, 2014

(65) Prior Publication Data
US 2016/0188145 A1     Jun. 30, 2016

Related U.S. Application Data

(60) Provisional application No. 61/751,312, filed on Jan. 11, 2013.

(51) Int. Cl.
*G06F 3/0484* (2013.01)
*G06F 9/451* (2018.01)
(Continued)

(52) U.S. Cl.
CPC ............ *G06F 3/0484* (2013.01); *B60K 35/00* (2013.01); *B60K 37/06* (2013.01); *G06F 3/0482* (2013.01);
(Continued)

(58) Field of Classification Search
CPC ....... G06F 3/0484; G06F 8/61; G06F 3/04817; G06F 3/0482; G06F 8/65
See application file for complete search history.

(56) References Cited

U.S. PATENT DOCUMENTS 6,563,430 B1    5/2003    Kemink et al.
6,633,315 B1 *  10/2003   Sobeski ................. G06F 9/451
                                                      715/762
(Continued)

FOREIGN PATENT DOCUMENTS

CA    2630067    5/2007
CN    1997957    7/2007
(Continued)

OTHER PUBLICATIONS

International Search Report and the Written Opinion of the International Searching Authority, International Application No. PCT/UCA2014/000001, pp. 1-14, dated Jun. 12, 2014.
(Continued)

*Primary Examiner* — Anil K Bhargava
(74) *Attorney, Agent, or Firm* — Bond, Schoeneck & King, PLLC

(57) ABSTRACT

An electronic device may have multiple users and multiple customized user interfaces for each user resulting in a large number of user customized UI dashboard configurations. However, defining these user customized UI dashboard configurations is performed by each user such that addition and/or replacement of software applications requires users to reconfigure customized UI dashboards. Similarly, organization generated dashboards must be configured on each user device. It would be beneficial for such user customized UI dashboard configurations to be updateable in response to information provided during new software installation, software upgrades etc or for UI dashboard configurations to be adjusted absent any such update/upgrade. It would also be
(Continued)

beneficial for context rules to be adaptable based upon learned behavior or external adjustments just as it would be beneficial for the context rule engine to automatically identify new potential rules as a result of current and previous behavior.

8 Claims, 15 Drawing Sheets

(51) Int. Cl.
    *G06F 9/445* (2018.01)
    *B60K 35/00* (2006.01)
    *B60K 37/06* (2006.01)
    *G06F 3/0481* (2013.01)
    *G06F 3/0482* (2013.01)
    *G06F 8/61* (2018.01)
    *G06F 8/65* (2018.01)

(52) U.S. Cl.
    CPC ............ *G06F 3/04817* (2013.01); *G06F 8/61* (2013.01); *G06F 8/65* (2013.01); *G06F 9/4451* (2013.01); *G06F 9/451* (2018.02); *B60K 2370/11* (2019.05); *B60K 2370/1438* (2019.05); *B60K 2370/563* (2019.05); *B60K 2370/5899* (2019.05); *B60K 2370/592* (2019.05); *B60K 2370/73* (2019.05)

(56) References Cited

U.S. PATENT DOCUMENTS

| | | |
|---|---|---|
| 6,748,195 B1 | 6/2004 | Phillips |
| 7,954,064 B2 | 5/2011 | Forstall et al. |
| 8,332,402 B2 | 12/2012 | Forstall et al. |
| 2003/0046401 A1 | 3/2003 | Abbott et al. |
| 2003/0182394 A1 | 9/2003 | Ryngler et al. |
| 2005/0054381 A1 | 3/2005 | Lee et al. |
| 2005/0091184 A1 | 4/2005 | Seshadri et al. |
| 2005/0283532 A1 | 12/2005 | Kim et al. |
| 2006/0015387 A1 | 1/2006 | Moore et al. |
| 2006/0015818 A1 | 1/2006 | Chaudhri et al. |
| 2006/0107219 A1 | 5/2006 | Ahya et al. |
| 2006/0270421 A1 | 11/2006 | Phillips et al. |
| 2007/0022380 A1 | 1/2007 | Swartz et al. |
| 2007/0073870 A1 | 3/2007 | Park et al. |
| 2007/0101279 A1 | 5/2007 | Chaudhri et al. |
| 2007/0101297 A1 | 5/2007 | Forstall et al. |
| 2007/0130541 A1 | 6/2007 | Louch et al. |
| 2008/0183559 A1 | 7/2008 | Frazier et al. |
| 2008/0189360 A1* | 8/2008 | Kiley ................ H04W 4/02 709/203 |
| 2008/0201649 A1 | 8/2008 | Mattila et al. |
| 2009/0024944 A1 | 1/2009 | Louch et al. |
| 2009/0063972 A1 | 3/2009 | Ma et al. |
| 2009/0064017 A1* | 3/2009 | Biniak ................ G06F 3/048 715/764 |
| 2009/0106697 A1* | 4/2009 | Ward ................ G06Q 10/06 715/835 |
| 2009/0228824 A1* | 9/2009 | Forstall ............ G06F 3/04817 715/779 |
| 2010/0132043 A1 | 5/2010 | Bjorn et al. |
| 2011/0034129 A1* | 2/2011 | Kim ................ G06F 1/1626 455/41.3 |
| 2011/0066951 A1* | 3/2011 | Ward-Karet ........ H04L 43/0894 715/744 |
| 2011/0072492 A1* | 3/2011 | Mohler ............ G06F 3/04817 726/3 |
| 2011/0154444 A1 | 6/2011 | Sriraghavan et al. |
| 2011/0214064 A1 | 9/2011 | Schneider et al. |
| 2012/0208564 A1 | 8/2012 | Clark et al. |
| 2013/0024760 A1* | 1/2013 | Vogel ................ G06F 9/44505 715/212 |
| 2014/0237589 A1 | 8/2014 | Suggs |

FOREIGN PATENT DOCUMENTS

| | | |
|---|---|---|
| CN | 102282549 | 12/2011 |
| CN | 102576281 | 7/2012 |
| EP | 2354923 | 8/2011 |
| JP | 2006107181 | 4/2006 |
| JP | 2010537601 | 8/2009 |
| JP | 2009199498 | 9/2009 |
| WO | 2007143057 | 12/2007 |
| WO | 2009012319 | 1/2009 |
| WO | 2010000738 | 1/2010 |
| WO | 2013102267 | 7/2013 |
| WO | 2014036636 | 3/2014 |

OTHER PUBLICATIONS

Partial Supplementary European Search Report, European Patent Application No. 14737486.2, pp. 1-7, dated Jul. 11, 2016.

Extended European Search Report, European Patent Application No. 14737486.2, pp. 1-10, dated Oct. 20, 2016.

* cited by examiner

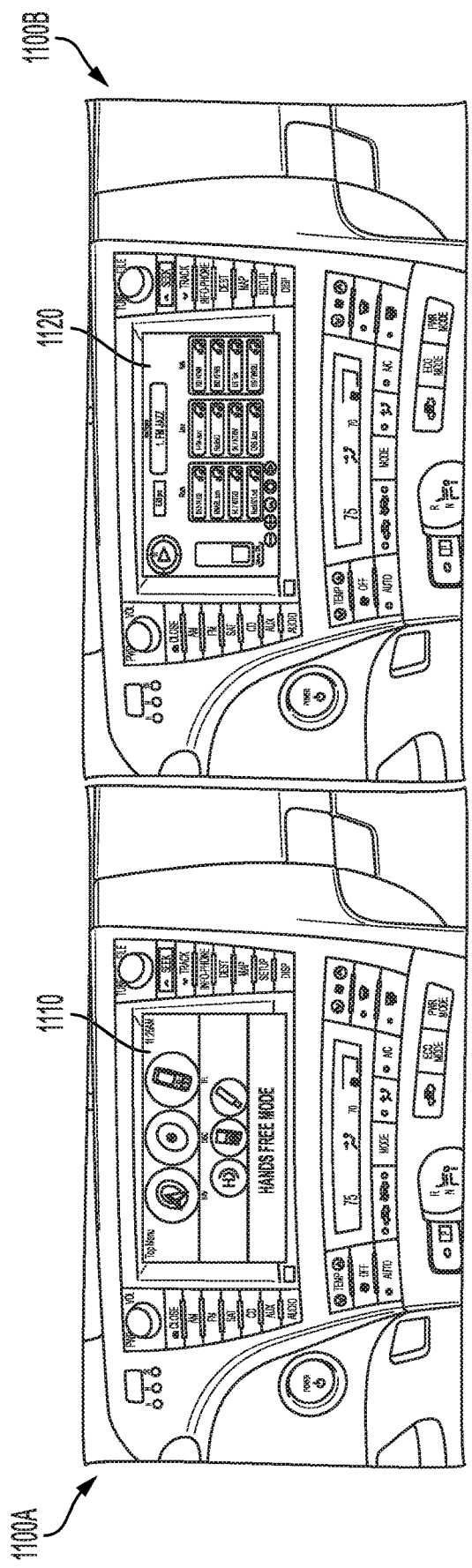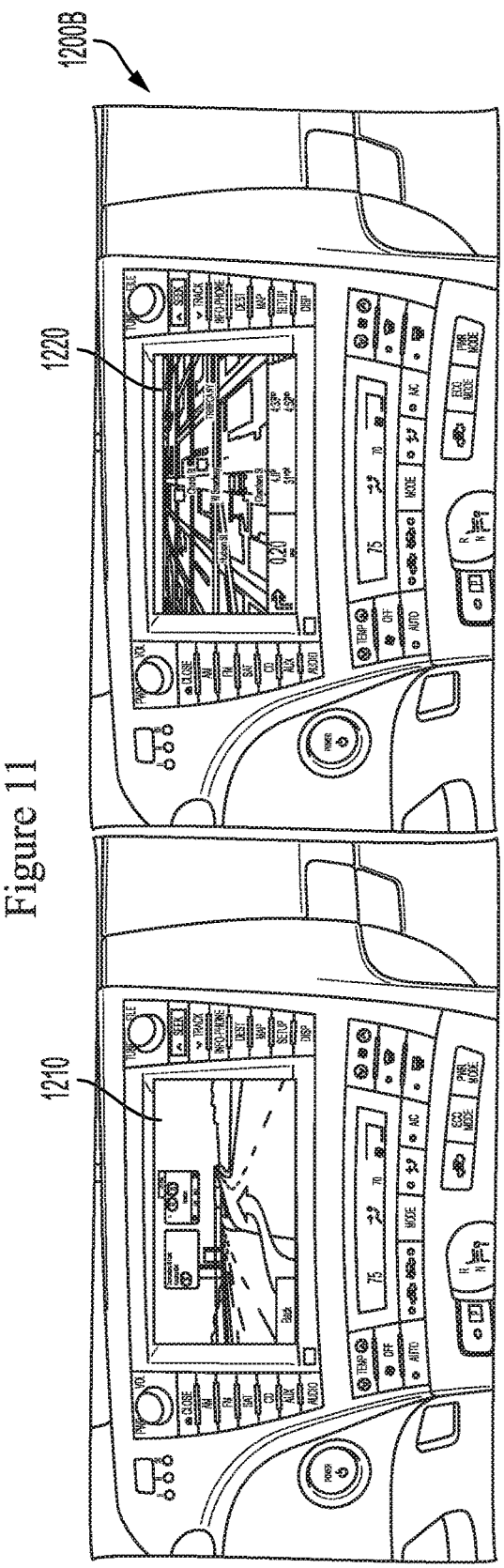
Figure 11
Figure 12

METHOD AND SYSTEM FOR CONFIGURING SELECTION OF CONTEXTUAL DASHBOARDS

CROSS-REFERENCE TO RELATED APPLICATIONS

This patent application claims the benefit of U.S. Provisional Patent Application 61/751,312 filed Jan. 11, 2013 entitled "Method and System for Configuring Selection of Contextual Dashboards", the entire contents of this patent application being included by reference.

FIELD OF THE INVENTION

The present invention relates to the user interfaces and in particular to context rules and rule engines for determined an applicable contextual user interface to employ.

BACKGROUND OF THE INVENTION

A user interface, in the industrial design field of human-machine interaction, is the "space" where interaction between humans and machines occurs. The goal of interaction between a human and a machine at the user interface is effective operation and control of the machine, and feedback from the machine to the user which aids the user in making operational decisions. Examples of this broad concept of user interfaces include the interactive aspects of computer operating systems, hand tools, heavy machinery operator controls, and process controls. The design considerations applicable when creating user interfaces are related to or involve such disciplines as ergonomics and psychology.

Accordingly a user interface is the system by which people (users) interact with a machine (device) and includes hardware (physical) and software (logical) components. User interfaces exist for a wide variety of systems, and provide a means of:

Input—allowing the users to manipulate a system; and
Output—allowing the system to indicate the effects of the users' manipulation.

Generally, the goal of human-machine interaction engineering is to produce a user interface which makes it easy, efficient, and enjoyable to operate a machine in the way which produces the desired result. This generally means that the operator needs to provide minimal input to achieve the desired output, that the machine minimizes undesired outputs to the human, and that the inputs provided by the operator are intuitive and logical. With the increased use of microprocessor based systems and the relative decline in societal awareness of heavy machinery, the term user interface has taken on overtones of the graphical user interface for electronic devices and systems, whilst industrial control panels and machinery control design discussions more commonly refer to human-machine interfaces. Other common terms for user interface include human-computer interface (HCI) and man-machine interface (MMI).

User interfaces are considered by some authors to be a prime ingredient of Computer user satisfaction. This arises as the design of a user interface affects the amount of effort the user must expend to provide input for the system and to interpret the output of the system, and how much effort it takes to learn how to do this. Usability is the degree to which the design of a particular user interface takes into account the human psychology and physiology of the users, and makes the process of using the system effective, efficient and satisfying.

Usability is mainly a characteristic of the user interface, but is also associated with the functionalities of the product and the process to design it. It describes how well a product can be used for its intended purpose by its target users with efficiency, effectiveness, and satisfaction, also taking into account the requirements from its context of use. In computer science and human-computer interaction, the user interface (of a computer program and/or electronic device) refers to the graphical, textual and auditory information presented to the user, and the control sequences (such as keystrokes with a computer keyboard or touchpad, movements of a computer mouse or finger on a touchpad, and other selections with one or more interfaces to the computer program and/or electronic device that the user employs to control the program Direct manipulation interfaces refers to a general class of user interfaces that allows users to manipulate objects presented to them, using actions that correspond at least loosely to the physical world. However, to date the prior art solutions are confusingly referred to as direct machine interfaces as the user directly selects a feature or an item through an action with a keyboard, touchpad or other input device. However, a point-and-click or touch operation by a user to select an item for movement does not correspond to the physical world where the user would normally pick the item through a pinching or gripping motion with their hand.

Currently the following types of user interface are the most common, graphical user interfaces (GUI) and web-based user interfaces (WUI, also known as web user interfaces). A GUI accepts user input via devices such as keyboard, mouse, and touchpad and provide articulated graphical input/output on the device's display. There are at least two different principles widely used in GUI design, object-oriented user interfaces (OOUIs) and application oriented interfaces (AOIs). Implementations may utilize one or more languages including, but not limited to, and be designed to operate with one or more operating systems, including but not limited to, Symbian, OpenIndiana, Haiku, Android, Windows, Mac OS, iOS, RISC OS, GNU/Linux, Tablet OS, and Blackberry OS as appropriate for portable electronic devices (PEDs) and for fixed electronic devices (FEDs).

A WUI accepts input and provide output by generating web pages which are transmitted via the Internet and viewed by the user using a web browser program. Implementations may utilize Java, AJAX, Adobe Flex, Microsoft .NET, or similar technologies to provide real-time control in a separate program, eliminating the need to refresh a traditional HTML based web browser. Administrative web interfaces for web-servers, servers and networked computers are often called control panels.

Originally user interfaces employed command line interfaces, where the user provided the input by typing a command string with the computer keyboard and the system provided output by printing text on the computer monitor. In many instances such interfaces are still used by programmers and system administrators, in engineering and scientific environments, and by technically advanced personal computer users. These were then augmented in the past with the introduction of controls (also known as widgets) including but not limited to windows, text boxes, buttons, hyperlinks, drop-down lists, tabs, and pop-up menu which may be augmented by Interaction elements are interface objects that represent the state of an ongoing operation or transformation, either as visual remainders of the user intent (such as the pointer), or as affordances showing places where the user may interact including, but not limited to, cursors, pointers and adjustment handles.

Today user interfaces have evolved to include:

Attentive user interfaces manage the user attention deciding when to interrupt the user, the kind of warnings, and the level of detail of the messages presented to the user.

Batch interfaces are non-interactive user interfaces, where the user specifies all the details of the batch job in advance to batch processing, and receives the output when all the processing is done.

Conversational Interface Agents attempt to personify the computer interface in the form of an animated person, robot, or other character and present interactions in a conversational form.

Crossing-based interfaces are graphical user interfaces in which the primary task consists in crossing boundaries instead of pointing.

Gesture interfaces are graphical user interfaces which accept input in a form of hand gestures, or mouse gestures sketched with a computer mouse or a stylus.

Intelligent user interfaces are human-machine interfaces that aim to improve the efficiency, effectiveness, and naturalness of human-machine interaction by representing, reasoning, and acting on models of the user, domain, task, discourse, and media (e.g., graphics, natural language, gesture).

Motion tracking interfaces monitor the user's body motions and translate them into commands.

Multi-screen interfaces, which employ multiple displays to provide a more flexible interaction and is often employed in computer game interactions.

Non-command user interfaces, which observe the user to infer his/her needs and intentions, without requiring that he/she formulate explicit commands.

Object-oriented user interfaces (OOUI) are based on object-oriented programming metaphors, allowing users to manipulate simulated objects and their properties.

Reflexive user interfaces where the users control and redefine the entire system via the user interface alone, for instance to change its command verbs.

Tangible user interfaces, which place a greater emphasis on touch and physical environment or its element.

Task-Focused Interfaces are user interfaces which address the information overload problem of the desktop metaphor by making tasks, not files, the primary unit of interaction Text user interfaces are user interfaces which output text, but accept other form of input in addition to or in place of typed command strings.

Voice user interfaces, which accept input and provide output by generating voice prompts. The user input is made by pressing keys or buttons, or responding verbally to the interface.

Natural-Language interfaces—Used for search engines and on webpages. User types in a question and waits for a response.

Zero-Input interfaces get inputs from a set of sensors instead of querying the user with input dialogs.

Zooming user interfaces are graphical user interfaces in which information objects are represented at different levels of scale and detail, and where the user can change the scale of the viewed area in order to show more detail.

However, despite the evolution of these multiple types of user interface these all treat the environment of the user upon the portable or fixed electronic device as a stable environment and do not fundamentally adjust the user interface or other aspects of the environment including the features and applications available based upon the user as an individual but rather assume all users engage an application in the same manner.

A property of a good user interface is consistency and providing the user with a consistent set of expectations, and then meeting those expectations. Consistency can be bad if not used for a purpose and when it serves no benefit for the end user, though; like any other principle, consistency has its limits. Consistency is one quality traded off in user interface design as described by the cognitive dimensions framework. In some cases, a violation of consistency principles can provide sufficiently clear advantages that a wise and careful user interface designer may choose to violate consistency to achieve some other important goal.

There are generally three aspects identified as relevant to consistency. First, the controls for different features should be presented in a consistent manner so that users can find the controls easily. For example, users find it difficult to use software when some commands are available through menus, some through icons, some through right-clicks, some under a separate button at one corner of a screen, some grouped by function, some grouped by "common," some grouped by "advanced." A user looking for a command should have a consistent search strategy for finding it. The more search strategies a user has to use, the more frustrating the search will be. The more consistent the grouping, the easier the search. The principle of monotony of design in user interfaces states that ideally there should be only way to achieve a simple operation, to facilitate habituation to the interface.

Second, there is the principle of astonishment in that various features should work in similar ways and hence an interface should not in one embodiment or situation require the user to "select feature, then select function to apply" and then in other situations "select function, and then select feature to apply. Commands should work the same way in all contexts. Third, consistency counsels against user interface changes version-to-version. Change should be minimized, and forward-compatibility should be maintained which adjusts as devices and interfaces mature. Traditionally, less mature applications and hardware had fewer users who were entrenched in any status quo and older, more broadly used applications and hardware had to carefully hew to the status quo to avoid disruptive costs and user backlash. However, today a new application and/or hardware element which is successful within the consumer field will evolve from nothing to millions of users within a very short period of time. For example, the Apple iPad™ was released April 2010 and sold 3 million units within the first 80 days. In the eight months of 2010 these sales totaled 14.8 million and in late 2011 Apple was widely believed to be on track to sell 40 million devices that year.

The design of user interfaces widely exploit mental models, which are generally founded on difficult to quantify, obscure, or incomplete facts, flexible which is considerably variable in positive as well as in negative sense, act as an information filter which cause selective perception (i.e. perception of only selected parts of information) and in many instances are limited when compared with the complexities surrounding the world. For example, the recently released Samsung Galaxy™ smartphone uses facial recognition to unlock the smartphone for a single user but does not perform any additional functionality as all protection is lost by simply giving the unlocked smartphone to another user.

Mental models are a fundamental way to understand organizational learning and in many instances are based upon deeply held images of thinking and acting. Mental models are so basic to understanding of the world that people are hardly conscious of them and are generally expressed in a couple of basic forms including:

Polygons—where vertices sharing an edge represent related items;

Causal-loop diagrams—which display tendency and a direction of information connections and the resulting causality; and Flow diagrams—which are used to express a dynamic system.

Accordingly, a users whilst unaware of the mental models employed anticipate users interfaces, software, and hardware to behave in particular ways and going against entrenched mental models will result in users feeling one or more of confused, ignored, and dissatisfied. Today social media mean that these users can rapidly express their opinions to a wide audience and negatively impact the commercial success of the software and/or hardware.

With the widespread penetration of portable electronic devices to consumers today a smartphone must support intuitive interfaces, provide rapid switching between applications allowing a user to browse, text, view, play, comment, etc through direct email, web based email, simple message service (SMS), telephony, multimedia applications, downloaded and online gaming, social media services, streamed multimedia content, etc. At the same time these portable electronic devices include multiple wireless interfaces, including but not limited to IEEE 802.11, IEEE 802.15, IEEE 802.16, IEEE 802.20, UMTS, GSM 850, GSM 900, GSM 1800, GSM 1900, and GPRS as well as one or more of Near Field Communication (NFC) interfaces, accelerometers, global positioning systems (GPS), and compass so that the devices are location aware and third party applications utilizing this information are increasing such as Google's Latitude, Apple's Find My Friends, and Singles Around Me.

With their ubiquitous nature and perceived personalized character smartphones are increasingly being targeted for other aspects of an individuals life such as purchasing with MasterCard's PayPass program or Visa's payWave, banking with applications from institutions such as Bank of America, Chase, PayPal, Wells Fargo, Capital One, American Express, and insurance with applications from State Farm etc as well as medical, news, lifestyle, health and fitness, and education. Accordingly, portable electronic devices such as a cellular telephone, smartphone, personal digital assistant (PDA), portable computer, pager, portable multimedia player, portable gaming console, laptop computer, tablet computer, and an electronic reader contain confidential and sensitive information relating to the user.

It is therefore increasingly beneficial for these electronic devices to adapt the applications, information, user interface etc presented to a user based upon the identity of the user. But additionally it would be beneficial for these aspects to be adjusted based upon the context of the user's use of the electronic device. Such principles, however, also apply to non-portable electronic devices such as Internet enable televisions, gaming systems, and desktop computers.

Accordingly user interfaces and electronic devices may be accessed and configured based upon biometric recognition of the user and new users may be added through processes well known in the art with new biometric recognition for the new user. These multiple users may be amplified for the same electronic device by users adding a context to their location through the electronic device associations to one or more wireless access points. As such each user may select to have two, three, or more user customized user interface (UI) dashboard configurations on the electronic device. The inventors have established methods for users to add new dashboards added by extending wireless access point association to micro-environmental contexts, dynamic contexts based upon other local users, as well as dynamic reconfiguration with changing context and intuitive interfaces. However, these dashboards are established based upon contextual rules installed as part of the operating system (OS) within the electronic device either as purchased or as upgrades periodically with OS software releases. However, it would be beneficial for the context rules as well as context options, context variables, context values, and logic to be dynamically varied in accordance with the use of the electronic device by the user as well as by third party software/service providers.

Similarly, defining the user customized UI dashboard configurations is performed by each user such that addition and/or replacement of software applications require users to reconfigure customized UI dashboards. Similarly, organization generating dashboards for employees and/or customers must configure each new user device. It would be beneficial for such user customized UI dashboard configurations to be updateable in response to information provided during new software installation, software upgrades etc or for UI dashboard configurations to be adjusted absent any such update/upgrade. It would also be beneficial for context rules to be adaptable based upon learned behaviour or external adjustments just as it would be beneficial for the context rule engine to automatically identify new potential rules as a result of current and previous behaviour.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations in the prior art relating to user interfaces and in particular to context rules and rule engines for determined an applicable contextual user interface to employ.

In accordance with an embodiment of the invention there is provided a method comprising:
establishing a context rule engine in execution upon a microprocessor comprising at least a context rule of a plurality of context rules, each context rule determining a user interface to display in dependence upon a predetermined set of conditions being met;
installing an application upon a device comprising at least the microprocessor, the application comprising first data relating to the application and second data relating to a context of displaying the application to a user of the device; and
modifying the at least one context rule in dependence upon the second data.

In accordance with an embodiment of the invention there is provided a method comprising:
executing a context rule engine upon a microprocessor comprising at least a context rule of a plurality of context rules, each context rule determining a user interface to display in dependence the result of applying a context rule meeting a predetermined condition;
receiving with the microprocessor context data relating to a plurality of factors;

determining in dependence upon the context data and the plurality of context rules that none of the context rules meet the predetermined condition;

varying a predetermined portion of the context rules;

determining that a varied context rule at least one of meets the predetermined condition and is closer to the predetermined condition; and adding the varied context rule to the plurality of context rules.

In accordance with an embodiment of the invention there is provided a method comprising:

executing a context rule engine upon a microprocessor executing at least one context rule of a plurality of context rules to determine the applicable context rule, each context rule relating to a specific user interface dashboard of a plurality of user interface dashboards and comprising at least a context factor and a weighting relating to the context factor;

executing a user interface generator upon a microprocessor to generate the user interface dashboard associated with the applicable context rule for presentation to a user.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 11 depicts contextually determined dashboards for a multimedia UI forming part of a console within a vehicle according to an embodiment of the invention;

FIG. 12 depicts contextually determined dashboards and route information for an in-console navigation system according to an embodiment of the invention;

DETAILED DESCRIPTION

Figure 1:
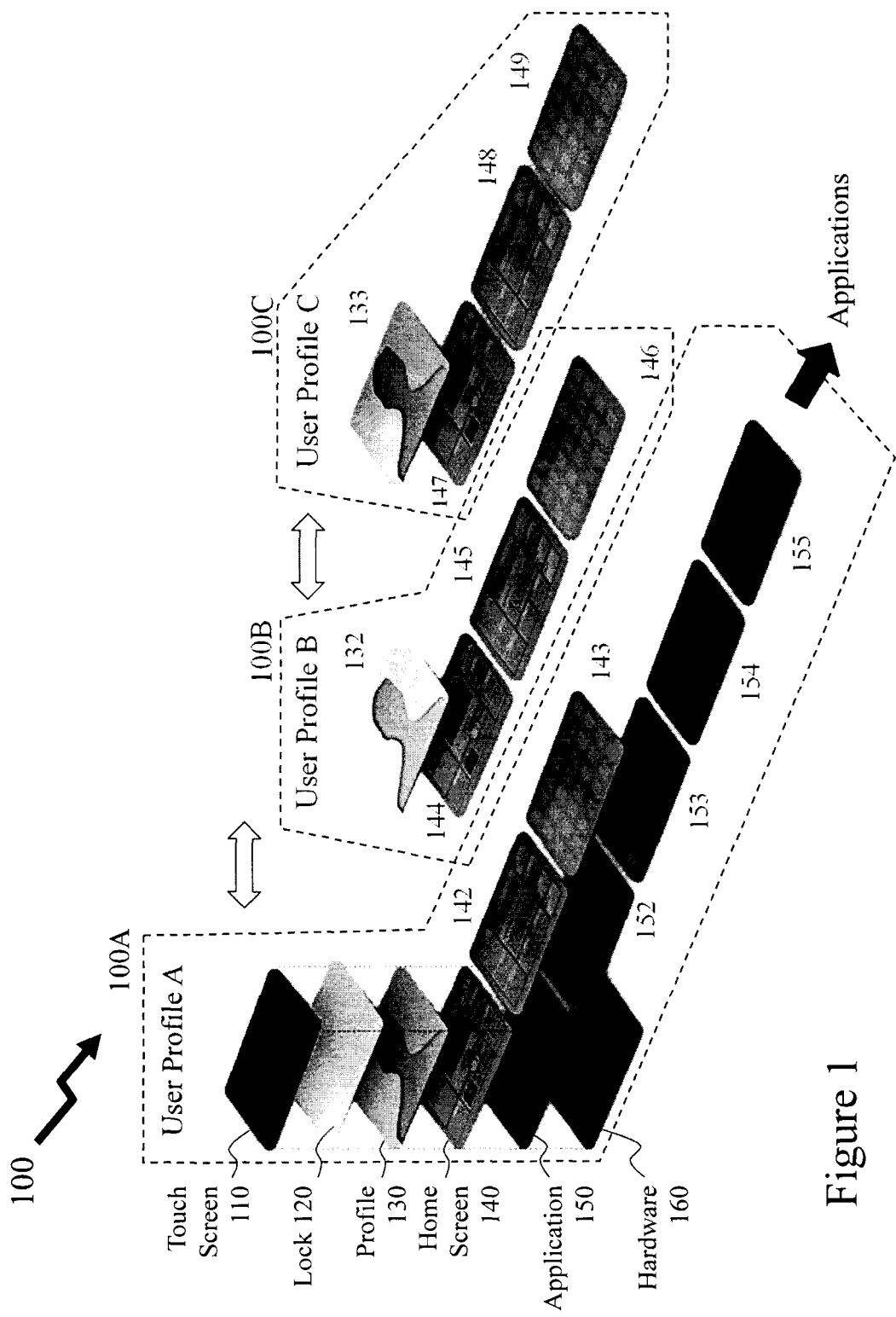
FIG. 1 depicts a contextual UI mental model according to an embodiment of the invention.

The present invention is directed to user interfaces and in particular to context rules and rule engines for determined an applicable contextual user interface to employ.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communication that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader. A "fixed electronic device" (FED) as used herein and throughout this disclosure, refers to a wireless device or wired device used for communication that does not require a battery or other independent form of energy for power. This includes devices, but is not limited to, Internet enable televisions, gaming systems, desktop computers, kiosks, and Internet enabled communications terminals.

A "network operator" or "network service provider" as used herein may refer to, but is not limited to, a telephone or other company that provides services for mobile phone subscribers including voice, text, and Internet; telephone or other company that provides services for subscribers including but not limited to voice, text, Voice-over-IP, and Internet; a telephone, cable or other company that provides wireless access to local area, metropolitan area, and long-haul networks for data, text, Internet, and other traffic or communication sessions; etc.

A "software system" as used as used herein may refer to, but is not limited to, a server based computer system executing a software application or software suite of applications to provide one or more features relating to the licensing, annotating, publishing, generating, rendering, encrypting, social community engagement, storing, merging, and rendering electronic content and tracking of user and social community activities of electronic content. The software system being accessed through communications from a "software application" or "software applications" and providing data including, but not limited to, electronic content to the software application. A "software application"

as used as used herein may refer to, but is not limited to, an application, combination of applications, or application suite in execution upon a portable electronic device or fixed electronic device to provide one or more features relating to one or more features relating to generating, rendering, managing and controlling a user interface. The software application in its various forms may form part of the operating system, be part of an application layer, or be an additional layer between the operating system and application layer.

A "user" as used herein and through this disclosure refers to, but is not limited to, a person or device that utilizes the software system and/or software application and as used herein may refer to a person, group, or organization that has registered with the software system and/or software application to acquire primary content and generates secondary content in association with the primary content. A "user interface" as used herein and through this disclosure refers to, but is not limited to a graphical user interface (GUI) and/or web-based user interface (WUI) which accepts user input from one or more user input devices and provides output to the user. Typically the user interface will provide articulated graphical input/output on a display and/or screen of an electronic device but may also provide articulated graphical output in conjunction with audio and/or tactile output as well as accepting input through audio, visual, and haptic interfaces.

Referring to FIG. 1 there is depicted a contextual UI mental model 100 according to an embodiment of the invention. Within the contextual UI mental model 100 first to third user profiles 100A through 100C are depicted for Users A, B, and C respectively. Considering first user profile 100A then this comprises a plurality of layers denoted as Touch Screen 110, Lock 120, Profile 130, Contextual dashboard 140, Application 150 and Hardware 160 wherein the contextual UI mental model 100 is implemented upon a portable electronic device such as a smartphone, tablet PC, and PDA wherein Touch Screen 110 provides the primary user input through the touch sensitive surface and the primary user output through the LCD/LED display. Accordingly, a user accessing Touch Screen 110 is presented with Lock 120 which according to embodiments of the invention provides biometric registration of the user.

Accordingly, the software application for a user providing valid biometric registration credentials determines which user profile of a plurality of user profiles to present to the user. Within this contextual UI mental model 100 the selection therefore is from User Profile A 100A, User Profile B 100B, and User Profile C 100C. If the selection was User Profile A 100A, relating to a first user A, then the user is presented with a contextual dashboard in dependence upon the context of the user at that point in time and their User A Profile 130, being thereby selected from first to third contextual dashboards 140, 142 and 143 respectively. Each of the first to third contextual dashboards 140, 142 and 143 respectively displays a predetermined combination of applications based upon one or more of the characteristics of the selected contextual dashboard, the settings from a previous session, and data retrieved relating to the displayed applications. These applications being selected from first to fifth applications 150 and 152 to 155 respectively.

Where the contextual UI mental model 100 establishes that the user is a second user, User B, then the selected user profile is User Profile B 100B. The presented contextual dashboard selected in dependence upon the context of the user at that point in time and their User B Profile 132, being thereby selected from fourth to sixth contextual dashboards 144 to 146 respectively. Each of the fourth to sixth contextual dashboards 144 to 146 respectively displays a predetermined combination of applications based upon one or more of the characteristics of the selected contextual dashboard, the settings from a previous session, and data retrieved relating to the displayed applications. These applications not displayed for clarity but may include one or more of the first to fifth applications 150 and 152 to 155 respectively as well as others.

If the contextual UI mental model 100 establishes that the user is a third user, User C, then the selected user profile is User Profile C 100C. The presented contextual dashboard selected in dependence upon the context of the user at that point in time and their User Profile C 133 being selected from seventh to ninth contextual dashboards 147 to 149 respectively. Each of the seventh to ninth contextual dashboards 147 to 149 respectively displays a predetermined combination of applications based upon one or more of the characteristics of the selected contextual dashboard, the settings from a previous session, and data retrieved relating to the displayed applications. These applications not displayed for clarity but may include one or more of the first to fifth applications 150 and 152 to 155 respectively as well as others.

It would be evident to one skilled in the art that the Touch Screen 110 may with variations in Hardware 160 be represented alternatively by one or more user input means and one or more user output means. It would also be apparent that according to the configuration and specifications of elements within the Hardware 160 aspects of the operation and performance of other levels may vary. An exemplary configuration for Hardware 160 is presented below in respect of FIG. 13 by Electronic Device 1304.

Figure 2A:
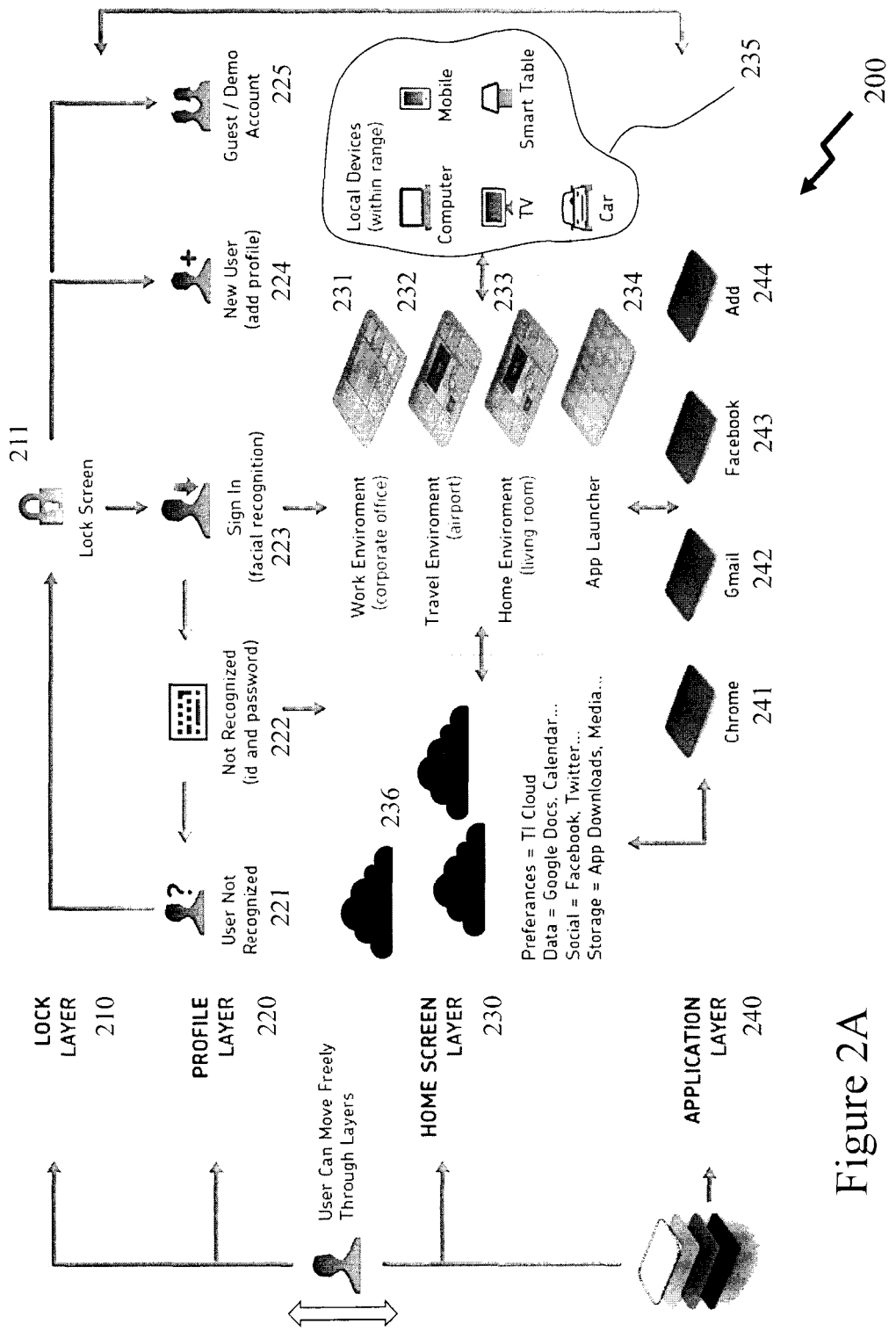
FIG. 2A depicts a contextual UI mental model according to an embodiment of the invention.

Referring to FIG. 2A there is depicted a contextual UI mental model 200 according to an embodiment of the invention. As shown the contextual UI mental model 200 comprises Lock Layer 210, Profile Layer 220, Contextual dashboard Layer 230, and Application Layer 240. Considering initially Lock Layer 210 then this comprises a Lock Screen 211 that locks the electronic device and requires that a user provide a valid credential or credentials in order to access the Profile Layer 220. Within Profile Layer 220 the contextual UI mental model 200 addresses results of biometric credential provision with Sign In 223 wherein a determination is made as to whether the biometric credential matches an authorised user of the electronic device. If so, the contextual UI mental model 200 proceeds to the Contextual dashboard Layer 230.

If the biometric credential does not match then the contextual UI mental model 200 moves to Not Recognised 222 wherein a user may present mechanically entered credentials, for example such as through providing an identity (ID) and an associated password via a keyboard/touchscreen etc. If these credentials are not correct the contextual UI mental model 200 provides a response to the user in User Not Recognised 221 and returns to the Lock Screen 211. At Lock Screen 211 a registered user may elect to add a further user wherein the contextual UI mental model 200 provides for biometric credential registration for the new user in New User 224. Alternatively the registered user may elect to allow another user to access the electronic device as a temporary user without stored credentials wherein the contextual UI mental model 200 allows for entry through a Guest Account 225.

From either Not Recognised 222 or Sign In 223 the contextual UI mental model 200 proceeds to Contextual dashboard Layer 230. In the instances of New User 224 and Guest Account 225 default contextual dashboards are presented to the user wherein in the former the new user may start the process of establishing characteristics of the contextual dashboard they desire for that current context. Subsequent access by the new user in different contexts will result over time in establishing additional contextual dashboards where appropriate for the user. Within contextual UI mental model 200 there is no customization of contextual dashboard for a guest entering through Guest Account 225.

In Home Layer 230 the selection of a contextual dashboard is made based upon macro-context data, including for example but not limited to electronic device associations, geographic location, network associations, and date and time. As depicted the contextual dashboards are Work Environment 231, Travel Environment 232, and Home Environment 233 as well as an Application Launcher 234 which is triggered to launch the applications which will be displayed within the selected contextual dashboard. Each contextual dashboard may be refined based upon micro-context data, including but not limited to electronic device associations, user input, and date and time. Examples of electronic device associations being depicted by device group 235 which includes a computer, a mobile device, television, smart table, an automobile. The Application Launcher 234 launches applications such as Google Chrome 241, Google Gmail 242 and Facebook 243 as well as an interface for adding new applications, Add 244.

Based upon the macro- and micro-context information together with the selected contextual dashboard and launched application data and/or content is retrieved either from within the electronic device supporting the UI or from one or more networks 236 to which the electronic device is connected. Such retrieved data includes user preferences, e.g. using TI Group's TI Cloud services; data source, e.g. Google Docs and Calendar; Social networks, e.g. Facebook and Twitter; and Storage, e.g. Application Downloads and Media sources. Optionally contextual UI mental model 200 may include additional layers to those depicted including but not limited to operating system, hardware, user attributes, user preferences and user input/output devices.

Figure 2B:
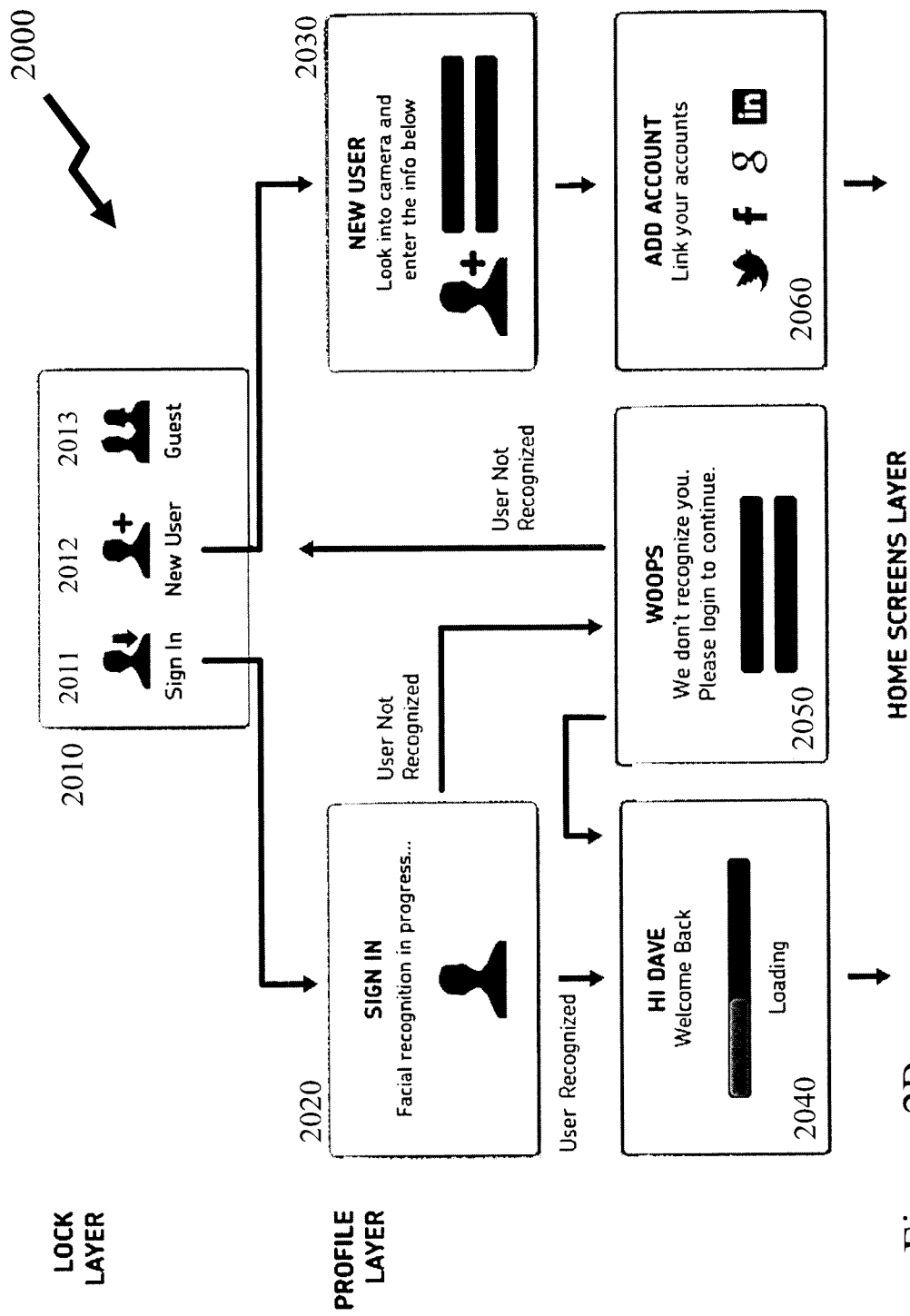
FIG. 2B depicts an exemplary profile layer flow according to an embodiment of the invention.

Now referring to FIG. 2B there is depicted an exemplary profile layer flow 2000 according to an embodiment of the invention wherein biometric credential entry is performed through facial recognition. Accordingly at Lock Layer 2010 responses to biometric credential and/or other data entry is determined as Sign In 2011, New User 2012, and Guest 2013. From Sign In 2011 the process flow proceeds to Profile Layer with Facial Recognition Sign In 2020 wherein the user is either recognized leading to progression to Welcome 2040 or not recognised leading to Woops 2050 wherein alternate credential entry is provided to the user. For example, the user may be in different lighting conditions, wearing clothing partially obscuring their face, etc. which causes the facial recognition process to fail even for an authorised user. Successful entry of the alternate credentials in Woops 2050 leads to Welcome 2040 otherwise the flow returns to Lock Layer 2010. From New User 2012 the flow proceeds to Face Entry 2030 wherein the new user is asked to look into the camera to allow an image to be captured for processing and storage as a new authorised facial credential. From New User 2012 the flow proceeds to Add Account 2060 wherein the new user is prompted to link predetermined applications within the default contextual dashboard(s) to their personal accounts, such as Twitter™, Facebook™, Gmail™, and LinkedIn™. From Add Account 2060 and Welcome 2040 the flow proceeds to the Contextual dashboards Layer which is not shown for clarity.

It would be evident to one skilled in the art that facial recognition represents only one potential biometric verification technique available. Any biometric identifier which is a distinctive, measurable characteristic used to differentiate individuals may be employed and are generally categorized as physiological or behavioral characteristics. Physiological characteristics are related to the shape of the body, and include but are not limited to, fingerprint, face recognition, DNA, palm print, hand geometry, iris recognition, retina recognition, DNA, and odour/scent. Behavioral characteristics include, but are not limited to, typing rhythm, gait, and voice. It would be evident to one skilled in the art that the selected biometric characteristic and/or physiological characteristic(s) and/or behavioral characteristic(s) may be selected according to the electronic device, the degree of security protection required, etc. and that in other instances two or more biometric characteristics may be employed. Within other embodiments of the invention the biometric characteristic and/or physiological characteristic(s) and/or behavioral characteristic(s) may be established through a combination of electronic devices associated with the electronic device being unlocked. For example, a user may seek to access a terminal but may not unless they have with them a PED whose identity is associated with the user profile which transmits a verification code based upon a gait recognition algorithm upon the PED verifying that the user carrying the PED when approaching the terminal is the user.

One potential disadvantage of some biometrics, such as facial recognition which is common due to smartphones and cellular telephones, laptops, tablet computers, etc. including a camera, is that if someone's face is compromised that it cannot be cancelled and re-issued unlike a token or password. For example, facial recognition may be tricked using an image of the user and combination of voice and facial recognition tricked using an audiovisual file for example. For example cancelable biometrics may perform a distortion of the biometric image or features before matching and it is the variability in the distortion parameters which provides the cancelable nature of the scheme. For example, a user may be asked to provide a series of images such as poking their tongue out, pulling a funny face, closing one or other eye, both eyes etc. in order to generate the reference image(s) for the facial recognition and the user is asked to provide one or more of these in each instance of accessing Lock Layer 2010.

Accordingly, embodiments of the invention may employ cancelable biometrics wherein protection is incorporated or replacement features are included during the user's accessing of a device. For example, a user may be asked to provide additional and/or replacement biometric data, e.g. images, during use wherein these augment or replace existing biometric credentials. Such triggers may be preprogrammed within the software executing the exemplary profile layer flow 2000 for example based upon user access counts, pseudorandom processes, etc. or may be triggered from other factors such as enterprise security protocols, enterprise triggers, etc. Accordingly, the credentials of a user may evolve and automatically cancelled/expired.

Figure 3:
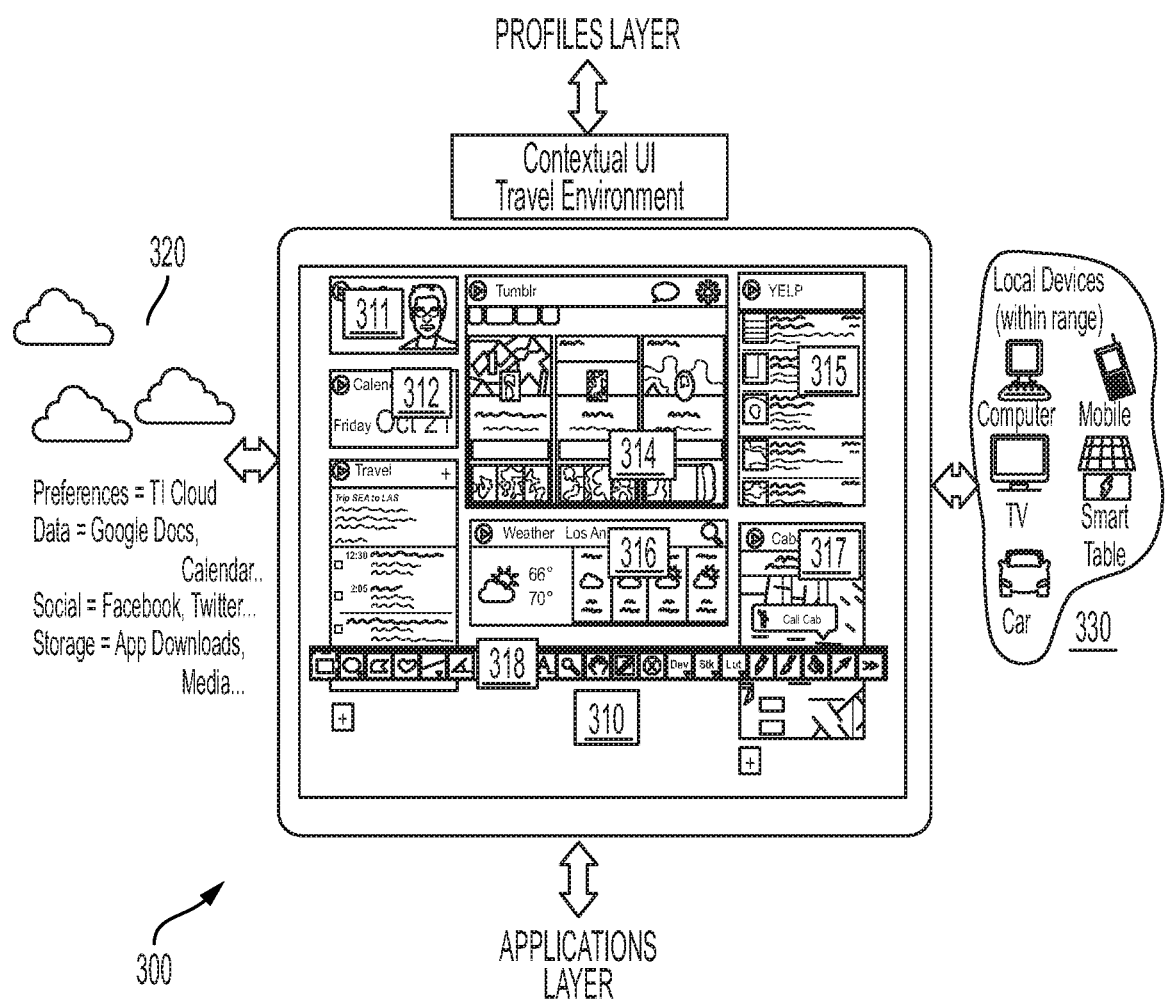
FIG. 3 depicts an exemplary contextual dashboard in travel mode presented to a user according to an embodiment of the invention.

Now referring to FIG. 3 there is depicted an exemplary contextual dashboard 310 for a UI 300 wherein the macro-context is travel as presented to a user according to an embodiment of the invention. Accordingly, contextual dashboard 310 sits between the profiles layer and applications layer of the UI 300 and has been established in dependence upon macro-context, not shown for clarity, and micro-context information 330. Data and content for the applications within contextual dashboard 310 being sourced from the electronic device and/or through remote sources 320 interfaced through one or more networks connected to the electronic device. Depicted within contextual dashboard 310 are applications for Profile 311, Calendar 312, Travel 313, Blog 314, Review 315, Weather 316, Taxi 317 as well as toolbar 318. Travel 313 may for example be TripIt™, Weather 316 AccuWeather, Blog 314 Tumblr™, Review 315 Yelp™ and Taxi 317 Cab4Me™.

Figure 4:
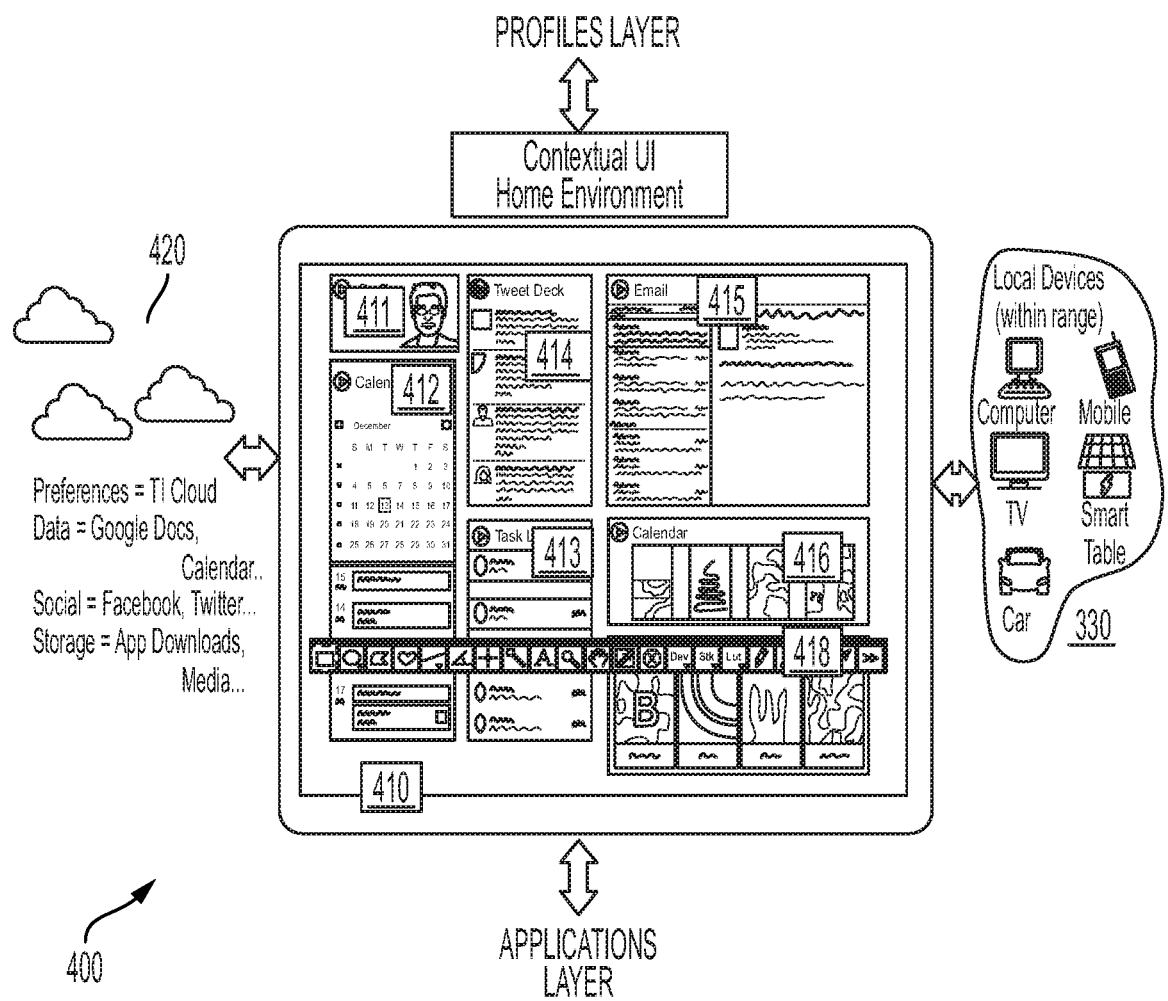
FIG. 4 depicts an exemplary contextual dashboard in work mode presented to a user according to an embodiment of the invention.

Now referring to FIG. 4 there is depicted an exemplary contextual dashboard 410 for a UI 400 wherein the macro-context is work as presented to a user according to an embodiment of the invention. Accordingly, contextual dashboard 410 sits between the profiles layer and applications layer of the UI 400 and has been established in dependence upon macro-context, not shown for clarity, and micro-context information 430. Data and content for the applications within contextual dashboard 410 being sourced from the electronic device and/or through remote sources 420 interfaced through one or more networks connected to the electronic device. Depicted within contextual dashboard 410 are applications for Profile 411, Calendar 412, Task List 414, Social Application 413, Email 415, eReader 416, News 417 as well as toolbar 418. Calendar 412 and Task 414 for example being Google Calendar and task list within Google Calendar, Social Application 413 for example being Tweet Deck, Email 415 for example being Google Gmail, eReader 416 for example being Kindle™ Reader, and News 417 being Yahoo™ News.

Figure 5:
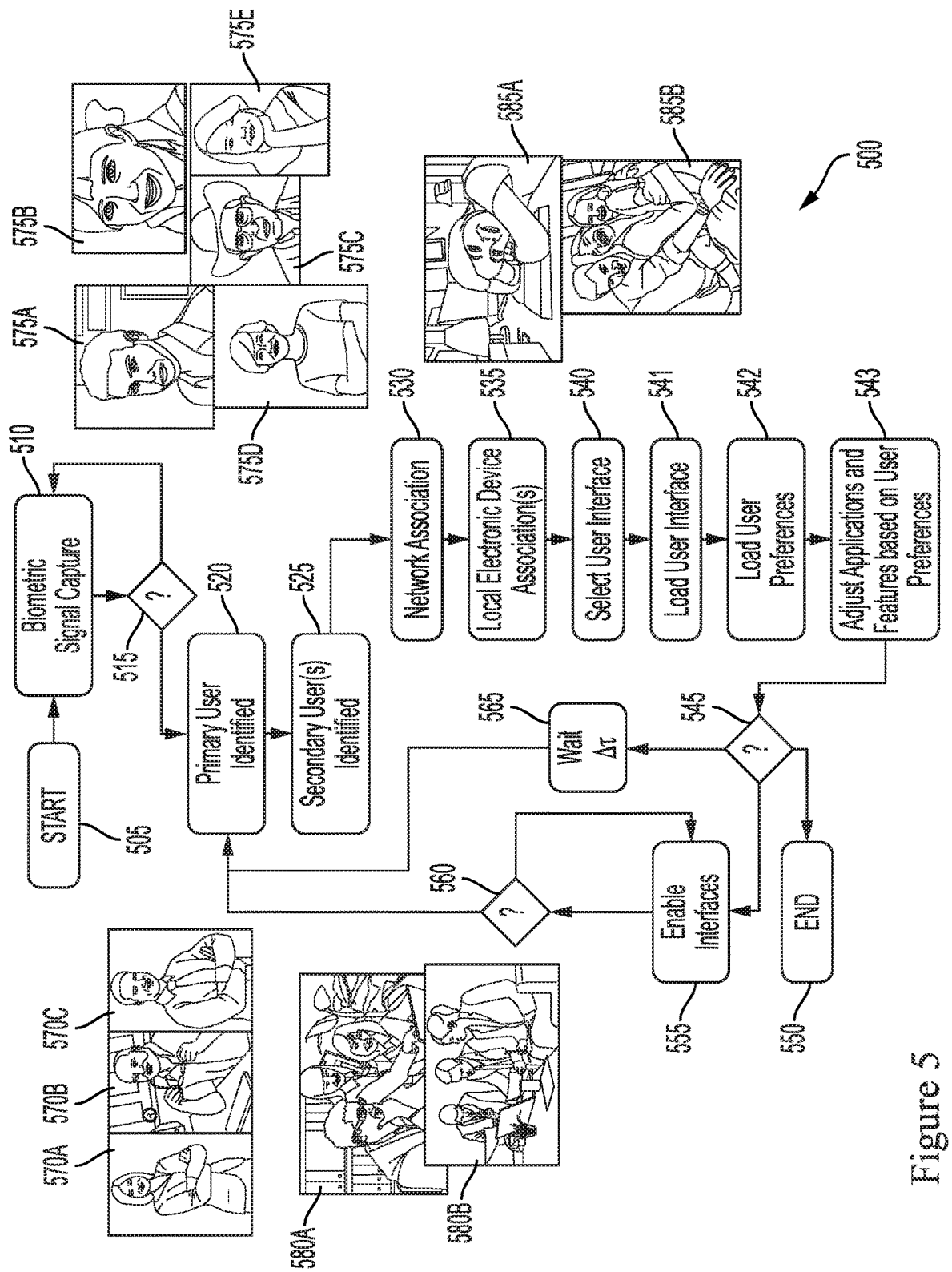
FIG. 5 depicts an exemplary process flow for user and context determination of macro- and micro-context factors according to an embodiment of the invention.

Now referring to FIG. 5 there is depicted an exemplary process flow 500 for user and context determination of macro- and micro-context factors according to an embodiment of the invention for a portable electronic device (PED). Accordingly the process begins at step 505 where a user picks up the PED and the UI receives accelerometer data which is used to trigger the UI to enter the lock screen from a sleep mode wherein in step 510 a user provides the biometric input which is evaluated in step 515 to determine whether the user is authorised. An example of steps 510 and 515 is presented above in respect of FIG. 3. In step 520 the UI determines identity of the primary user for whom biometric verification was obtained and then proceeds in step 525 to determine whether secondary users are present. For example the UI may analyse the remainder of the image taken for a facial recognition of the user to determine whether there are other individuals in the image as well as receiving additional input such as audio to form part of the determination of secondary users.

Next in step 530 the UI proceeds to determine network associations for the PED and then local electronic device associations in step 535. These are all used in conjunction with primary and secondary user data and other contextual information including, but not limited to, GPS data, accelerometer data, date, time, background of image (where facial recognition is employed) in step 540 to determine the contextual dashboard to be employed. This is then loaded in step 541 wherein the UI proceeds to load the user preferences associated with the selected dashboard of the plurality of available dashboards. Next in step 543 the UI adjusts the features of the applications and the applications based upon the user preferences. For example, where the user is identified to be "Tom" working at their office then the email application opened is Microsoft Outlook and the preferences are their user name and password but where it is determined "Tom" is at home then the application may be Google Gmail and no preferences are used. Alternatively, the user may be identified as "Tom" at home without additional individuals present in which case a setting such as "Mature Content" within an Internet Browser, e.g. Internet Explorer, is set to off but within another instance the user whilst being established as "Tom" then visual image processing establishes the presence of a child or audio processing similarly associates a child with the environment of the PED in which case the "Mature Content" setting is automatically set to "Strict" such that content from any searches is filtered.

Next in step 545 the process determines whether the UI is established in periodic or single access mode, the former relating to periodic verification of the macro- and micro-context information and the latter to no subsequent verification until a timeout or other condition is met and the screen locks. If the latter the process moves to step 550 and stops, otherwise it proceeds to step 555 wherein periodic verification is to be based upon environmental data or step 565 wherein the periodic verification is based upon a time interval, $\Delta\tau$. If the process proceeds on time interval basis then after a delay of $\Delta\tau$ the process moves to step 520. If based on environmental data then the PED enables interfaces in step 555 and looks for additional user characteristics in step 560 wherein absence results in the process looping back to step 555 and presence results in the process proceeding back to step 520.

It would be evident that rather than proceeding to loop back to step 520 that the process may alternatively loop back to step 510 and repeat biometric verification. Optionally this pauses all applications until verification is provided, such as with a fingerprint and facial recognition, or without pause wherein a verification may be processed without disrupting the user's activity such as with facial recognition. Accordingly biometric verification may be allowed on the electronic device for first to fifth family members 575A through 575E representing a father, mother, son, daughter, and grandfather and first to third staff 570A through 570C representing work colleagues. Optionally a user, such as father, being first family member 575A may appear in both and hence second staff 570B may also be the same individual. As such the primary user would be selected from first to fifth family members 575A through 575E and first to third staff 570A through 570C.

Secondary users may be identified from the unlock sequence, such as within the image captured for facial recognition or through interfaces on the PED such as the microphone during operation of the PED with the UI unlocked so that these are captured in the absence of electronic device associations with the secondary user's PEDs or FEDs. It would be evident that secondary user is a broad term in this context as these individuals may not be actually using the PED but are within the micro-environment of the user and hence impact the micro-context. For example, an adult user unlocking the PED may establish Google Image searches to be unrestricted on content but this may be inappropriate where the secondary users are present such as work colleagues, as depicted in first and second work groups 580A and 580B or children as depicted in first and second family groups 585A and 515B respectively.

It would be evident to one skilled in the art that based upon the macro- and micro-context aspects of the UI that the lock in screen may be similarly considered a contextual dashboard such that first and third staff 570A and 570C may only unlock the PED according to an embodiment of the invention when the macro- and micro-context select a contextual dashboard having them as authorised users. Accordingly, a manager may authorise their administration assistant to access their PED at work, no one else in travel mode, and their family when the PED is at home. Accordingly, the manager may have full access rights to certain applications and their administration assistant limited access rights to those applications and his family no access rights. Similarly the user's family would be unable to unlock the PED at the user's office and perhaps only the adults the PED in travel mode to limit children playing with it.

It would be evident to one skilled in the art how evolution of the micro-context concept may be evolved from one wherein these are statically allocated at user log-in to one wherein they are allocated dynamically in dependence upon the actual environment. For example the following scenarios relating to dynamically assigned contextual dashboards may be implemented according to embodiments of the invention:

User A logs-in and UI establishes a contextual dashboard but they pass the PED to another user, User B, who now has access to the User A contextual dashboard plus preferences, accordingly the UI is monitoring periodically digital and/or video content acquired from the device and notes the user change and swaps to either User B contextual dashboard where recognised user or guest screen;

User A logs-in and UI establishes a contextual dashboard but now the user puts the device down onto to a table and hence they are now no linger visible if the UI is checking image but their speech is now recognised and the UI maintains the current contextual dashboard whereas absent voice recognition the UI establishes a lock-screen;

User A logs-in and UI establishes a contextual dashboard but now UI detects another individual behind User A and adjusts the contextual dashboard or closes it down and warns User A;

User A logs-in and UI establishes a first contextual dashboard but now User A moves with the PED and maintains activity with it and User A now enters another recognized micro- and macro-context environment such that the UI now changes the contextual dashboard from the original context to the new context, where such changes may be evolved slowly such that for example applications currently not in use are adjusted immediately but those in use are maintained or gradually adjusted where possible or upon user verification/confirmation;

User A logs-in and UI establishes a contextual dashboard with the user displaying content on another display associated with the PED and the PED display is presenting a large keyboard, the user then moves and the UI automatically updates the contextual dashboard such that the content is now presented to the user on their PED seamlessly and the keyboard is reduced to that normally presented to the user on the PED.

It would be evident to one skilled in the art that UI contextual dashboards according to embodiments of the invention by providing macro-context and micro-context variations where selected by the user provide for a dynamic migration of the UI according to the user's activities and schedule. How many contextual dashboards a user establishes is their personal preference although a PED or FED may provide initially a limited number of default contextual dashboards for configuration. In other embodiments of the invention the UI correlates and samples macro-context and micro-context information to determine whether a user may benefit from another contextual dashboard in addition to those currently established.

Figure 6:
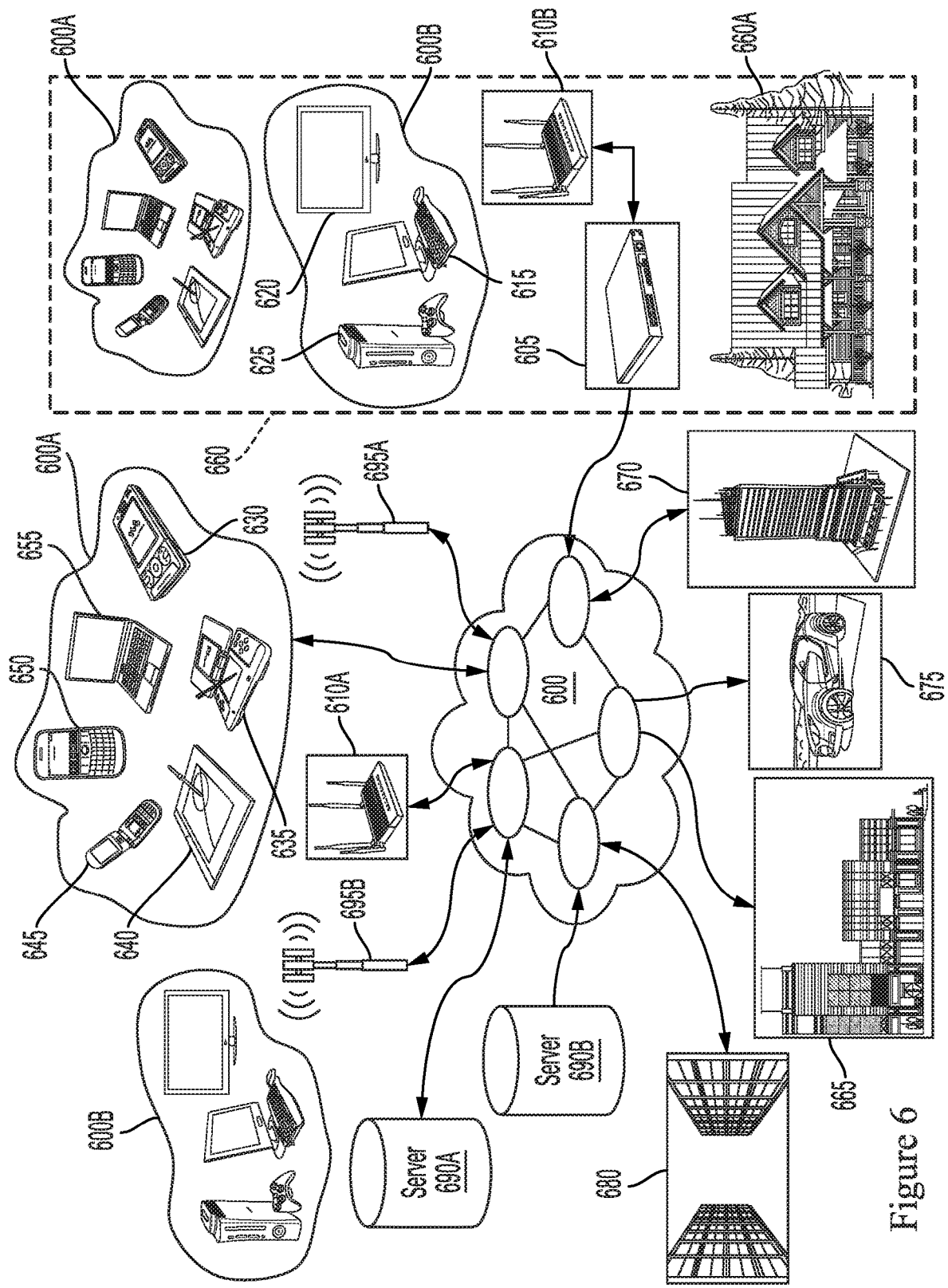
FIG. 6 depicts a network supporting communications to and from electronic devices implementing contextual based UIs according to embodiments of the invention.

Now referring to FIG. 6 there is depicted a network 600 supporting communications to and from electronic devices implementing contextual based UIs according to embodiments of the invention. As shown first and second user groups 600A and 600B respectively interface to a telecommunications network 600. Within the representative telecommunication architecture a remote central exchange 680 communicates with the remainder of a telecommunication service providers network via the network 600 which may include for example long-haul OC-48/OC-192 backbone elements, an OC-48 wide area network (WAN), a Passive Optical Network, and a Wireless Link. The central exchange 680 is connected via the network 600 to local, regional, and international exchanges (not shown for clarity) and therein through network 600 to first and second wireless access points (AP) 695A and 695B respectively which provide Wi-Fi cells for first and second user groups 600A and 600B respectively. Also connected to the network 600 are first and second Wi-Fi nodes 610A and 610B, the latter of which being coupled to network 600 via router 605. Second Wi-Fi node 610B is associated with residential building 660A and environment 660 within which are first and second user groups 600A and 600B. Second user group 600B may also be connected to the network 600 via wired interfaces including, but not limited to, DSL, Dial-Up, DOCSIS, Ethernet, G.hn, ISDN, MoCA, PON, and Power line communication (PLC) which may or may not be routed through a router such as router 605.

Within the cell associated with first AP 610A the first group of users 600A may employ a variety of portable electronic devices including for example, laptop computer 655, portable gaming console 635, tablet computer 640, smartphone 650, cellular telephone 645 as well as portable multimedia player 630. Within the cell associated with second AP 610B are the second group of users 600B which may employ a variety of fixed electronic devices including for example gaming console 625, personal computer 615 and wireless/Internet enabled television 620 as well as cable modem 605.

Also connected to the network 600 are first and second APs which provide, for example, cellular GSM (Global System for Mobile Communications) telephony services as well as 3G and 4G evolved services with enhanced data transport support. Second AP 695B provides coverage in the exemplary embodiment to first and second user groups 600A and 600B. Alternatively the first and second user groups 600A and 600B may be geographically disparate and access the network 600 through multiple APs, not shown for clarity, distributed geographically by the network operator or operators. First AP 695A as show provides coverage to first user group 600A and environment 660, which comprises second user group 600B as well as first user group 600A. Accordingly, the first and second user groups 600A and 600B may according to their particular communications interfaces communicate to the network 600 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-2000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly portable electronic devices within first user group 600A may form associations either through standards such as IEEE 802.15 and Bluetooth as well in an ad-hoc manner.

Also connected to the network 600 are retail environment 665, first commercial environment 670, and transport 675 as well as first and second servers 690A and 690B which together with others not shown for clarity, may host according to embodiments of the inventions multiple services associated with a provider of the software operating system(s) and/or software application(s) associated with the electronic device(s), a provider of the electronic device, provider of one or more aspects of wired and/or wireless communications, product databases, inventory management databases, retail pricing databases, license databases, customer databases, websites, and software applications for download to or access by fixed and portable electronic devices. First and second primary content sources 690A and 690B may also host for example other Internet services such as a search engine, financial services, third party applications and other Internet based services.

Figure 7:
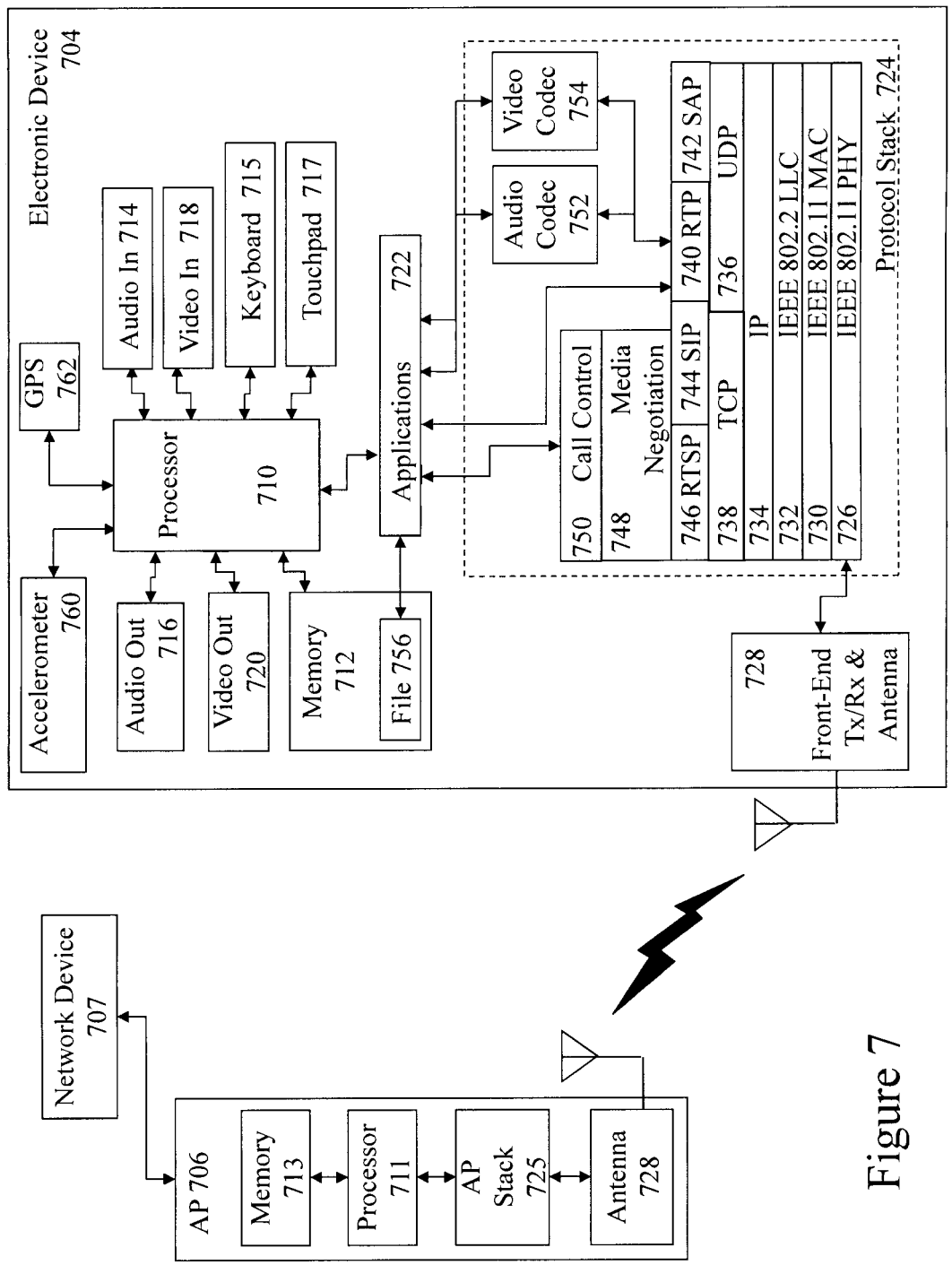
FIG. 7 depicts an electronic device and network access point supporting contextual based UIs according to embodiments of the invention.

FIG. 7 there is depicted an electronic device 704 and network access point 707 supporting contextual based UIs according to embodiments of the invention. Electronic device 704 may for example be a portable electronic device or a fixed electronic device and may include additional elements above and beyond those described and depicted. Also depicted within the electronic device 704 is the protocol architecture as part of a simplified functional diagram of a system 700 that includes an electronic device 704, such as a smartphone 655, an access point (AP) 706, such as first AP 610, and one or more network devices 707, such as communication servers, streaming media servers, and routers for example such as first and second servers 690A and 690B respectively. Network devices 707 may be coupled to AP 706 via any combination of networks, wired, wireless and/or optical communication links such as discussed above in respect of FIG. 1. The electronic device 704 includes one or more processors 710 and a memory 712 coupled to processor(s) 710. AP 706 also includes one or more processors 711 and a memory 713 coupled to processor(s) 711. A non-exhaustive list of examples for any of processors 710 and 711 includes a central processing unit (CPU), a digital signal processor (DSP), a reduced instruction set computer (RISC), a complex instruction set computer (CISC) and the like. Furthermore, any of processors 710 and 711 may be part of application specific integrated circuits (ASICs) or may be a part of application specific standard products (ASSPs). A non-exhaustive list of examples for memories 712 and 713 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 704 may include an audio input element 714, for example a microphone, and an audio output element 716, for example, a speaker, coupled to any of processors 710. Electronic device 704 may include a video input element 718, for example, a video camera, and a video output element 720, for example an LCD display, coupled to any of processors 710. Electronic device 704 also includes a keyboard 715 and touchpad 717 which may for example be a physical keyboard and touchpad allowing the user to enter content or select functions within one of more applications 722. Alternatively the keyboard 715 and touchpad 717 may be predetermined regions of a touch sensitive element forming part of the display within the electronic device 704. The one or more applications 722 that are typically stored in memory 712 and are executable by any combination of processors 710. Electronic device 704 also includes accelerometer 760 providing three-dimensional motion input to the process 710 and GPS 762 which provides geographical location information to processor 710.

Electronic device 704 includes a protocol stack 724 and AP 706 includes a communication stack 725. Within system 700 protocol stack 724 is shown as IEEE 802.11 protocol stack but alternatively may exploit other protocol stacks such as an Internet Engineering Task Force (IETF) multimedia protocol stack for example. Likewise AP stack 725 exploits a protocol stack but is not expanded for clarity. Elements of protocol stack 724 and AP stack 725 may be implemented in any combination of software, firmware and/or hardware. Protocol stack 724 includes an IEEE 802.11-compatible PHY module 726 that is coupled to one or more Front-End Tx/Rx & Antenna 728, an IEEE 802.11-compatible MAC module 730 coupled to an IEEE 802.2-compatible LLC module 732. Protocol stack 724 includes a network layer IP module 734, a transport layer User Datagram Protocol (UDP) module 736 and a transport layer Transmission Control Protocol (TCP) module 738.

Protocol stack 724 also includes a session layer Real Time Transport Protocol (RTP) module 740, a Session Announcement Protocol (SAP) module 742, a Session Initiation Protocol (SIP) module 744 and a Real Time Streaming Protocol (RTSP) module 746. Protocol stack 724 includes a presentation layer media negotiation module 748, a call control module 750, one or more audio codecs 752 and one or more video codecs 754. Applications 722 may be able to create maintain and/or terminate communication sessions with any of devices 707 by way of AP 706. Typically, applications 722 may activate any of the SAP, SIP, RTSP, media negotiation and call control modules for that purpose. Typically, information may propagate from the SAP, SIP, RTSP, media negotiation and call control modules to PHY module 726 through TCP module 738, IP module 734, LLC module 732 and MAC module 730.

It would be apparent to one skilled in the art that elements of the electronic device 704 may also be implemented within the AP 706 including but not limited to one or more elements of the protocol stack 724, including for example an IEEE 802.11-compatible PHY module, an IEEE 802.11-compatible MAC module, and an IEEE 802.2-compatible LLC module 732. The AP 706 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module.

Portable and fixed electronic devices represented by electronic device 704 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-2000, DSL, Dial-Up, DOCSIS, Ethernet, G.hn, ISDN, MoCA, PON, and Power line communication (PLC).

It would be evident to one skilled in the art that the number of contextual dashboards may be limited for some users, wherein in fact the UI essentially provides only a single contextual dashboard, and be significant for others who may have multiple contextual dashboards associated with home, work, recreation, travel etc. for themselves and that these may be present for others within their family. Accordingly a tablet for a family of four, two adults and two children, may have the following 12 contextual dashboards:

Home=7, a macro-context associated with each member of the family plus a micro-contexts associated for each adult working at home, plus 1 micro-context for the adults removing parental controls for their bedroom; School=2, a macro-context associated with each child; Work=2, a macro-context associated with each adult; and Travel=1, a macro-context associated with all family members.

Figure 8:
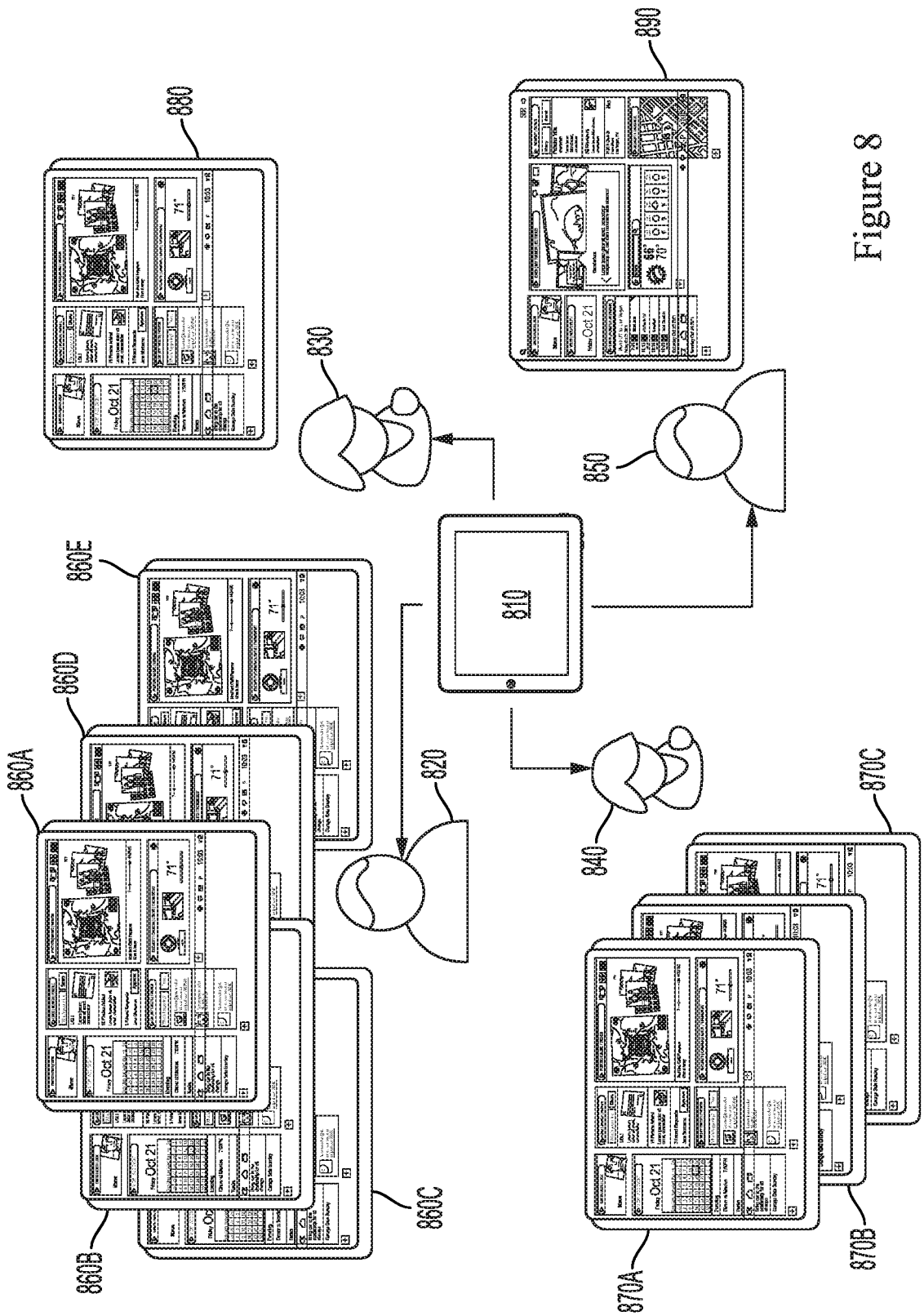
FIG. 8 depicts a portable electronic device having multiple associated users each with user customized contextual based UI dashboards according to an embodiment of the invention.

Referring to FIG. 8 there is depicted a PED 810 having multiple associated users within a family each with user customized contextual based UI dashboards according to an embodiment of the invention. Accordingly first to fourth users 820 through 850 each have associated with their user account one or more dashboards. First user 820, for example the father—husband, has first to fifth UI dashboards 860A through 860E which may relate, for example, to work and home contextually established user customized dashboards such as described above in respect of FIGS. 1 through 7. Second user 840, for example the mother—wife, has sixth to eighth UI dashboards 870A through 870C respectively which may relate, for example, to home contextually established user customized dashboards such as described above in respect of FIGS. 1 through 7. Third and fourth users 830 and 850 respectively, for example a daughter and son, have ninth and tenth UI dashboards 880 and 890 respectively which each relate, for example, to home user customized dashboards such as described above in respect of FIGS. 1 through 7 but without contextual variations. This ability having been restricted by the parents although optionally in other situations each of third and fourth users 830 and 850 respectively may have different levels of access to contextual dashboard customization.

Accordingly, when the PED 810 is replaced by this family, either as the result of an upgrade to another PED, replacement through loss, or replacement through defect then all of these user customized contextual and non-contextual UI dashboards are lost requiring the users to re-establish them on the new PED. Similarly, if one user, e.g. first user 820 acquires another PED they must re-establish their user customized contextual and non-contextual UI dashboards on the new PED. Alternatively, a user, e.g. first user, may have two PEDs and due to circumstances, e.g. taking the incorrect PED or losing one PED, may have taken the PED with their home contextual UI dashboards to their work wherein the work contextual UI dashboards they normally use are now unavailable to them. Irrespective of the root cause it would be evident that in each such instance the user or users must expend valuable time to establish these contextual and non-contextual UI dashboards on either the new or alternative PED.

Figure 9:
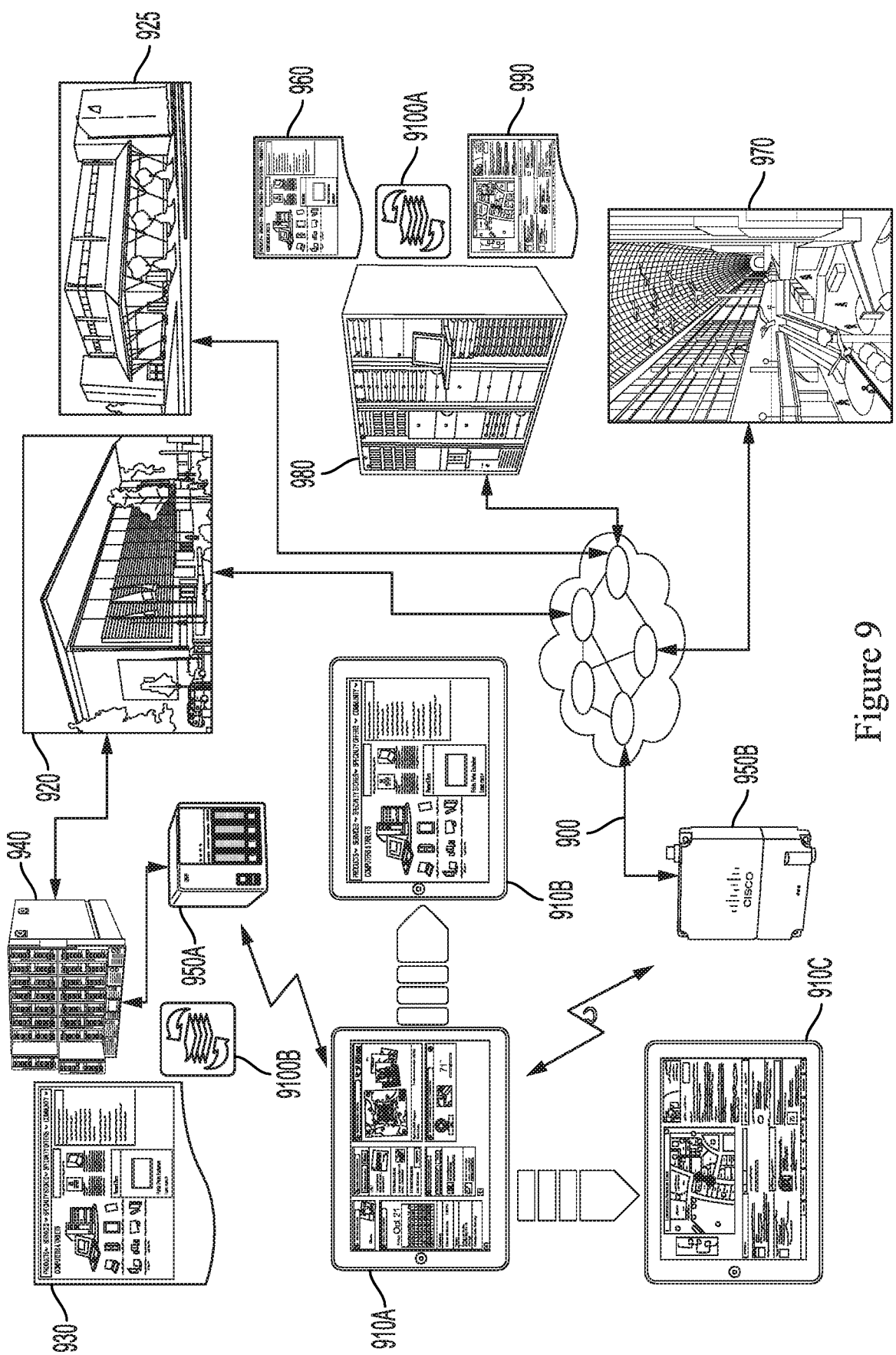
FIG. 9 depicts web and enterprise based provisioning of non-user defined contextual based UI dashboards according to an embodiment of the invention.

Now referring to FIG. 9 there is depicted web and enterprise based provisioning of non-user defined contextual based UI dashboards according to an embodiment of the invention. Accordingly, a user (not shown for clarity) has a PED 910A associated with them that supports customized and/or contextual UI dashboards and one or more wireless communication interfaces. Also depicted is Retailer 920 having a Local Server 940 and a first Wireless Access Point (WAP) 950A associated with the location of Retailer 920 and a communication interface to Remote Server 980 via Network 900 either through the Local Server 940 or another element of the Retailer's 920 electronic infrastructure. Stored upon Local Server 940 is first UI Datafile 930 relating to the Retailer 920 whilst a second UI Datafile 960 also associated with the Retailer 920 is stored upon the Remove Server 980.

A Mall 970 is also depicted in communication with the Remote Server 980 via Network 900 wherein a third UI Datafile 990 associated with the Mall 970 is stored upon the Remove Server 980. The Remote Server 980 is also connected via Network 900 to a second WAP 950B. Accordingly when the user with their PED 910A comes into communication range of second WAP 950B a communication session is established between the PED 910A and Remote Server 980 resulting in the third UI Datafile 990 being transferred to the PED 910A thereby resulting in Mall Dashboard 910C being displayed to the user on their PED 910A. As depicted Mall Dashboard 910C provides the user with a map of the Mall 970 indicating their location as well as other features including guest services and the specials currently being offered to by retailers within the Mall 970.

Alternatively, the user with their PED 910A comes into communication range of the first WAP 950A wherein a communication session is established between the PED 910A and Local Server 940 resulting in the first UI Datafile 930 being transferred to the PED 910A thereby resulting in Retailer Dashboard 910B being displayed to the user on their PED 910A. As depicted the Retailer Dashboard 910B provides access to product information, social media links relating to Retailer 920, account information and store rewards. Alternatively, rather than downloading the first UI Datafile 930 the communication session results in the second UI Datafile 960 being retrieved from the Remote Server 980 and provided to the PED 910A.

It would be evident to one skilled in the art that each of the Local Server 940 and Remote Server 980 may host multiple UI Datafiles relating to different context aware customizable UI dashboards for presentation to the user on their PED 910A. For example, in the case that Retailer 920 is an electronics retailer such as Best Buy™ their US stores may provide UI dashboards in English and Spanish whilst their Canadian stores may provide UI dashboards in English and French from their Local Servers 940. However, users entering their stores may access other UI dashboards through the Remote Server 980 such that for example a US resident with preference for Spanish may be supported in a Canadian store of Retailer 920 and a French speaking user may be supported in a US store of Retailer 920 even though neither Local Server 940 hosts the data files for these UI dashboards.

It would be also evident that a Local Server 940 may provide multiple dashboards such that the user is provided with a different UI dashboard as they enter the Appliances section of the Retailer's 920 store to that when they enter the TV & Home Theater section of the store. Alternatively the UI dashboard provided, such as in the instance of language selection, is based upon user preference data transmitted from the user's PED 910A such that UI dashboard is selected or modified in accordance with the user preference data such as, for example, enabling an audio based UI dashboard for users with reduced visual acuity, providing user account information based upon the association of the user's PED 910A to an account of the user, displaying pricing data in their preferred currency, or establishing recommendations based upon the user's account and prior purchases with the Retailer 920. Similarly, the UI dashboard provided to the user within the Mall 970 may be contextually provided such that whilst a map for example is consistently displayed only offers or information relating to the stores within the immediate vicinity of the user are provided and change as the user moves through the Mall 970. Similarly, the map may vary as the user moves upon one level of the Mall or changes level.

It would be evident that any enterprise may provide a user with a dashboard on their electronic device using embodiments of the invention as described above in respect of FIG. 9. For example a restaurant may provide a dashboard with their menu and an ordering interface, a sports arena a dashboard providing fans with multiple video replay options and fan incentives, a hotel a dashboard providing checkin-checkout and guest services etc., and an airport passenger checkin-arrival-departure information with real time updates.

It would be evident that within the prior art the addition of a new UI dashboard, albeit customized to user preferences such as described supra in respect of FIG. 9 is automatically displayed to the user upon downloading. However, according to embodiments of the invention the first to third UI datafiles 930, 960, and 990 respectively rather than providing multiple UI dashboards based upon actions such as moving into a different section of the retailing environment, considering the application discussed above in respect of FIG. 9 with Retailer 920 and Mall 970 may provide multiple dashboards and/or multiple dashboard elements together with contextual rule sets such as Local Rule Set 9100B from Local Server 940 or Remote Rule Set 9100A from Remote Server 980. Accordingly, the contextual rule set directly or in combination with other rule sets on the user's PED 910A establishes the dashboard and/or dashboard elements to be presented to the user. Accordingly, should the user at a later point in time enter Box Store 925 representing, for example, a competitor to Retailer 920 the contextual rule set may display a dashboard or dashboard element(s) relating to the Retailer 920. Optionally, the dashboard may be retrieved from Remote Server 980 so that the user has the latest update from Retailer 920 in respect of a particular product, product type, etc based upon the determination made by the contextual rule engine with the user's PED 910A. Alternatively as discussed below in respect of FIGS. 13A, 13B, and 14 these new dashboard(s) and/or dashboard element(s) may add new elements to or amend elements within the contextual rules relating to one or more contexts within the contextual rule engine.

Figure 10:
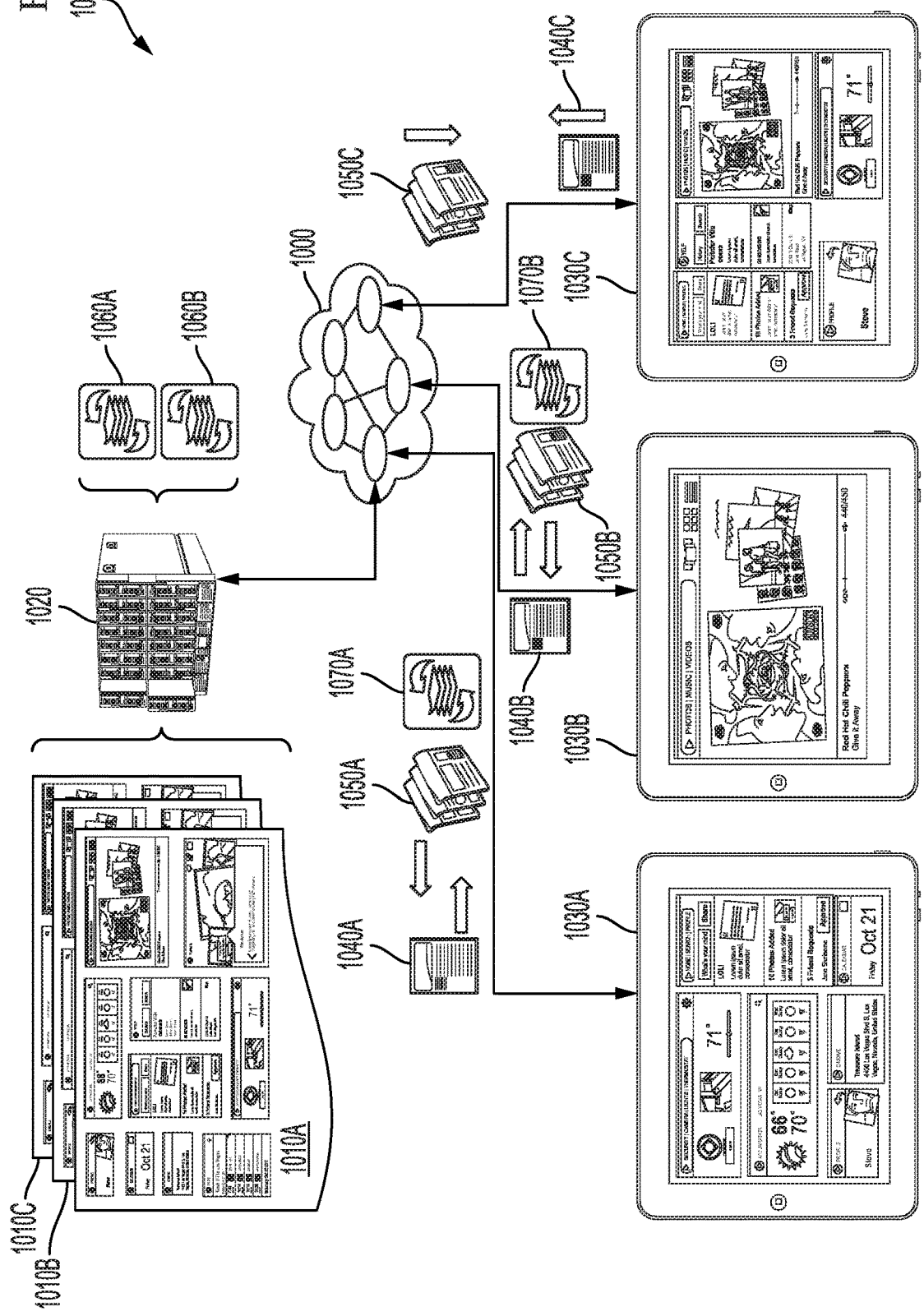
FIG. 10 depicts customized UI dashboard generation to users by an enterprise in dependence upon templates transferred from their portable electronic devices according to an embodiment of the invention.

Now referring to FIG. 10 there is depicted customized UI dashboard generation schematic 1000 wherein dashboards are provided to users by an enterprise in dependence upon templates transferred from their portable electronic devices according to an embodiment of the invention. As depicted a Server 1020 stores first to third UI Dashboards 1010A through 1010C respectively together with first to third Rule Sets 1060A through 1060C respectively. For example first UI Dashboard 1010A and associated first Rule Set 1060A relate to a first enterprise, for example a retailer; second UI Dashboard 1010B and second Rule Set 1060B relate to a second enterprise, for example a shopping centre; and third UI Dashboard 1010C relates to a third enterprise, for example a law firm. As depicted no Rule Set is associated with the third UI Dashboard 1010C. A user, not shown for clarity, with their first PED 1030A now as the result of an action, such as coming within range of a WAP for example, triggers a process accessing first UI Dashboard 1010A and first Rule Set 1060A but prior to a datafile being transferred from the Server 1020 to their first PED 1030A via a network 1000 a first Dashboard Template file 1040A is transmitted from their PED 1030A to the Server 1020 thereby resulting in the downloading of first User Specific UI Datafile 1050A. Accordingly, the first UI Dashboard 1010A has been modified in dependence upon the first Dashboard Template file 1040A such that first User Specific UI Datafile 1050A comprises only those elements of the first UI Dashboard 1010A meeting the requirements set by the first user. Also transferred to the user's first PED 1030A is the first Rule Set 1060A as first Rule Set Amendment 1070A which as discussed below in respect of FIGS. 13A through 14, for example, results in a modified rule set for the contextual rule engine within first PED 1030A.

Similarly, second and third users with their respective second and third PEDs 1030B and 1030C trigger processes accessing second and third UI Dashboards 1010B and 1010C respectively wherein their respective second and third Dashboard Template files 1040B and 1040C respectively are transferred to the Server 1020 resulting in the downloading of second and third User Specific UI Datafiles 1050B and 1050C respectively which comprise only those elements required to meet the user specific requirements defined by the second and third Dashboard Template files 1040B and 1040C. The second user in downloading second User Specific UI Datafile 1050B also downloads second Rule Set 1060B as second Rule Set Amendment 1070B which as discussed below in respect of FIGS. 13A through 14, for example, results in a modified rule set for the contextual rule engine within first PED 1030B.

Alternatively, rather than datafiles being transferred from the user's PED to the Server 1020 and customized dashboard datafiles being downloaded a single common UI Dashboard datafile may be transferred to each PED and dynamically configured for display on the user's PED in dependence upon the user's Dashboard Template file. For example, the second user may have poor visual acuity such that their dashboard is displayed at a large font size or that dashboard elements with high resolution detail are omitted and/or adjusted.

Optionally, the Dashboard Template files may be employed to determine whether another dashboard of the plurality of dashboards stored at the Server 1020 should be retrieved or that elements from one, two or more dashboards should be extracted, combined and/or retrieved. Optionally, two or more dashboards may be downloaded to the PED and the required elements combined locally at the PED rather than remotely at the Server 1020. It would be evident that accordingly a dashboard may be generated based upon user preferences and/or settings associated with the user in such instances rather than requiring the user to generate such as customized UI dashboard themselves. Such dashboard customization in dependence upon user preferences and/or settings may be determined in part or completely through the use of contextual rules within a contextual rule engine. Optionally no Dashboard Template files are transferred from the user's PED to the Server 1020 but rather the contextual rule engine based upon the current values of the contextual elements may generate a dashboard or UI interface based upon these rules and their results thereby allowing the PED software system to dynamically adjust the contextual UI dashboard to the user's preferences and/or circumstances.

Accordingly, through embodiments of the invention user defined and non-user defined contextual based UI dashboards may be transferred to a PED and/or FED through one or more network interfaces of the PED and/or FED. Accordingly, contextual based UI dashboards may be remotely hosted and provisioned based upon identification of the user in association with macro- and micro-context information. For example, a user may access a web portal upon their PED at work wherein one or more contextual based UI dashboards are provided to them. Subsequently, the user may access the web portal through another PED at home wherein the one or more contextual based UI dashboards are provided to them as the web portal is a macro-context element.

Now referring to FIG. 11 there are depicted first and second contextually determined UI dashboards (Context UID) 1110 and 1120 respectively for a multimedia UI forming part of a console within a vehicle implemented according to an embodiment of the invention. As depicted in first image 1100A the multimedia UI is presenting first Context UID 1110 wherein the user is visually prompted that the multimedia UI is in Hands Free Mode based upon a determination that there is only the driver within the vehicle, which may be derived from a sensor(s) within the vehicle seats, bodywork, etc or through the association of a single PED to an automotive network, such as for example a Bluetooth node within the vehicle. In second image 1100B the multimedia UI now displays second Context UID 1120, representing, a Touch Mode wherein the multimedia. UI allows settings of the multimedia player within the vehicle to be adjusted based upon user interactions with the Touch Mode 1120 interface. In this instance a context rule engine associated with the multimedia UI has determined that there is a passenger in the passenger seat of the vehicle, such as through sensors within the vehicle seats, bodywork, etc or through the association of PEDs to the automotive network. However, the presence of two PEDs according to the rules of the contextual rule engine may not be sufficient to place the multimedia UI in touch mode 1120 as opposed to Hands Free Mode 1110. For example, the presence of PEDs associated with a mother and her teenage son may trigger the Touch Mode 1120 but the mother with her 9 year old daughter does not as her daughter is in the back seats of the vehicle in order to meet legal requirements. It would be evident that in addition to adjusting the mode of the multimedia UI that other aspects of the operation of the multimedia UI may be configured including, but not limited to, audio only, radio station presets, MP3 player connection, satellite radio, and Radio Data System setting (e.g. to automatically retune to traffic bulletins for example).

Accordingly, within embodiments of the invention the buttons may be selectively enabled/disabled based upon the macro- and micro-context information. Hence, with a single user established within the vehicle the system may toggle between first Context UID 1110 (Hands Free) and second Context UID 1120 (Touch Mode) based upon speed such that the micro-context of travelling below, for example 5 km/h, allows the user to operate in Touch Mode for the central console buttons etc. However, above this these are disabled leaving control through voice control alone or in combination with buttons upon the steering console. The functionality of such buttons may vary in combination with the voice control such that the user may, for example, adjust the radio in one mode and adjust the navigation system in another mode. In other embodiments of the invention the Context UID presented when a passenger is present may only provide functionality to the right hand side of the console, this being closest to the passenger and furthest from the driver.

Now referring to FIG. 12 there are depicted first and second Context UIDs 1210 and 1220 respectively for a vehicle navigation system (NAVSYS), commonly referred to as a GPS system or satellite navigation system, forming part of a console within a vehicle implemented according to an embodiment of the invention. As depicted in first image 1200A the first Context UID 1210 of the NAVSYS UI is presented in Highway Mode 1210 based upon a determination that the driver within the vehicle is qualified to drive on all roads, which may be for example derived from the driver entering a passcode to the NAVSYS, an image acquired by a camera in the console, or through the association of their PED to an automotive network, such as for example a Bluetooth node within the vehicle. In second Context UID 1200B the NAVSYS UI is in Local Mode 1120 wherein the NAVSYS provides navigation directions without including highways of a certain category on the grounds that the driver is not certified for these. For example, in Canada a learner driver may not drive upon 400. Series highways whilst in another jurisdiction a driver may be allowed access to some highways when a qualified driver is present with them but not otherwise. In other embodiments of the invention the visual mode of the NAVSYS may be adjusted according to preferences of the user whilst in another the user preferences for establishing a journey may be adjusted, e.g. one user wishes to avoid travelling through a central business district whereas another user does not have such restrictions.

Accordingly, the context rule engine associated with the NAVSYS may provide, for example a mother navigation based upon all route options whilst their daughter is limited to certain route options unless the context rule engine determines that the mother, or father, or driving instructor or other adult identified to the NAVSYS system as allowed to supervise the daughter's driving is present. It would be evident that the first and second Context UIDs 1210 and 1220 may similarly provide hands free and touch modes in a similar manner as the multimedia UI described supra in respect of FIG. 11 based upon factors including, but not limited, to the number of individuals within the vehicle, who is in the vehicle, and user preferences. Optionally, the contextual rule engine may also be interfaced to the engine management system of the vehicle such that a learner driver may not even start the vehicle unless the system identifies an allowed supervisory individual as being present.

Figure 13:
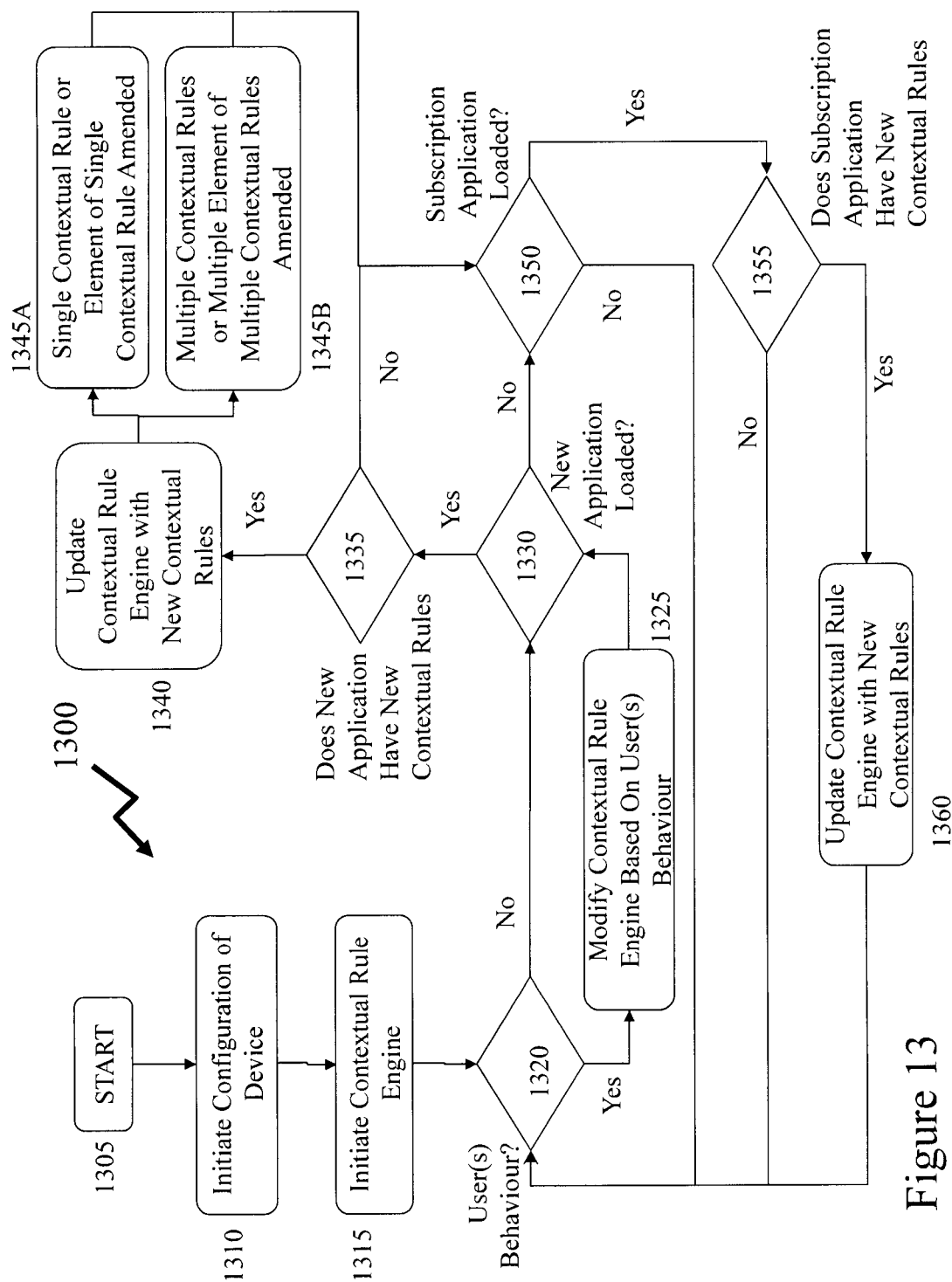
FIG. 13 depicts an exemplary flowchart relating to the amendment of contextual rules based upon application variations/installations upon a device according to an embodiment of the invention.

Referring to FIG. 13 there is depicted an exemplary flowchart 1300 relating to the amendment of contextual rules based upon application variations/installations upon a device according to an embodiment of the invention. Accordingly, the process begins at step 1305 with a start command to the device upon which the context rule engine (CTXTREng) is installed. Next in step 1310 the device is initiated followed by initiation of the CTXTREng in step 1315 and a determination as to whether user behaviour has been modified sufficiently to warrant a change to the CTXTREng is then made in step 1320. According to some embodiments of the invention the CTXTREng interacts with a record of user behaviour to make this determination or as described below in respect of FIG. 14 this determination is arrived at as no existing context rule adequately matches the current context. If a determination is made in step 1320 that a change is required the process proceeds to step 1325 wherein the CTXTREng is modified, for example as described below in respect of FIG. 14 before proceeding to step 1330. If in step 1320 the determination is no change the process proceeds directly to step 1330.

At step 1330 a determination is made regarding whether a new application has been loaded onto the device wherein if negative the process proceeds to step 1350 otherwise it proceeds to step 1335. In step 1335 the process determines whether the new application has new context rules or adjustments to the context rules that should be applied. If not the process proceeds to step 1350, otherwise it proceeds to step 1340 wherein the CTXTREng is updated with the new contextual rules and/or adjustments of the context rules via single rule update process in step 1345A or multiple rule update process in step 1345B which in addition to updating the contextual rules applies context rule conflict checks to ensure that amendments to rules will operate correctly. For example, if an existing context rule states display "Home Environment after 7 pm when BSSID=01:23:45:67:89:AB" then such a check/verification ensures that a newly added application does not try to apply a new context rule "When BSSID=01:23:45:67:89:AB and Day=Monday and Time=7 pm Turn-Off." Such conflicts may be presented to the user currently using the device for resolution or if they apply to another user currently not using the device they may be stored for presentation to them at the next point they access the device, similarly with the intention of obtaining resolution from the user. After either of processes 1345A or 1345B the process proceeds to step 1350 wherein a determination is made as to whether any subscription type applications are loaded on the device wherein if not the process proceeds back to step 1320 otherwise it proceeds to step 1355 for a determination of whether one or more of the subscription type applications have new contextual rules. If so, the process proceeds to step 1360 wherein these are applied before looping back to step 1320 otherwise the process proceeds directly to step 1320. Process step 1360 may for example comprise similar steps to process steps 1340, 1345A and 1345B as described supra. Examples of subscription type applications, also known as Software-as-a-Service (SaaS), may include, for example, those associated with commercial software applications, museums, retailers, financial institutions, journals, magazines, operating systems, publishers, and media.

It would be evident to one skilled in the art that the installation of a new software application and/or software upgrade may be implemented through the transfer of two parts to the data. The first part relating to the software application/upgrade and the second part relating to new context rules and/or modifications to context rules. Optionally, the second part (or a third part) may also include modifications to one or more UI dashboards with respect to the context rules and/or software applications. Accordingly, an organization may "push" simultaneously to all of their users a new UI dashboard, a new context rule, and a new software application without requiring either every user to either have their device worked upon by the organizations Information Technology department or make the amendments themselves. In other instances, for example, a museum may have visitors receive a UI dashboard that relates to the museum when they are within the museum but may "push" new "applications" relating to new exhibitions etc so that the user dashboard evolves to reflect the current activities/exhibitions etc.

It would be evident to one skilled in the art that exemplary process 1300 as described above in respect of a new application, with its associated dashboards, UIs, UI dashboards, etc, may be similarly applied to the installation of a new UI dashboard(s) as a discrete element/elements on a device or the installation of a new UI dashboard element(s) as a discrete element/elements on the device. For example, a salesperson with an organization employing Microsoft Dynamics CRM in conjunction with Microsoft Outlook may have their work dashboard changed by the employer to include Microsoft Dynamics NAV software and remove Microsoft Dynamics CRM or may a specific non-interactable window presenting predetermined aspects of the Microsoft Dynamics NAV system on the employers remote servers displayed as an element of their dashboard together with Microsoft Dynamics CRM and Microsoft Outlook.

Figure 14:
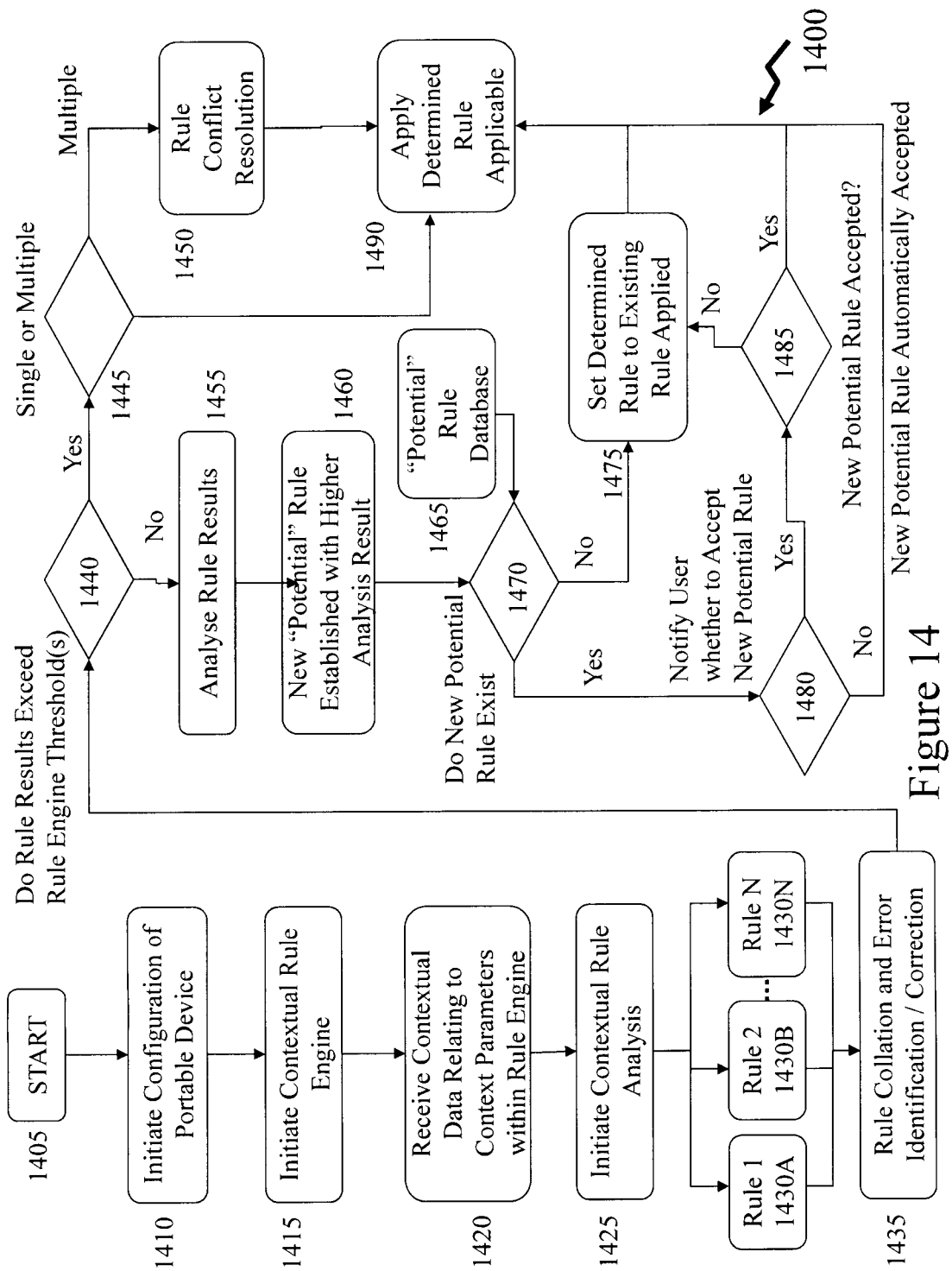
FIG. 14 depicts an exemplary flowchart relating to a contextual rule engine for determining an applicable contextual rule according to an embodiment of the invention.

FIG. 14 depicts an exemplary flowchart 1400 relating to a contextual rule engine for determining an applicable contextual rule according to an embodiment of the invention. Accordingly, the process begins at step 1405 with a start command to the device upon which the context rule engine (CTXTREng) is installed. Next in step 1410 the device is initiated followed by initiation of the CTXTREng in step 1415 wherein contextual data relating to the device, user, device environment, etc are provided to the CTX-TREng in step 1420 from a variety of sources including, but not limited to, Global Positioning Systems (GPS), altimeter, accelerometer, environmental sensors, WiFi/WiMAX node identities (IDs), base station ID, clock, associated PED(s), associated FED(s), vehicle network association, ad-hoc network association, current user, last user, and last dashboard, last UI interaction, and device orientation. According, the CTXTREng then initiates one or more contextual rule analysis routines (CTXTRAR) which execute as depicted as steps 1430A, 1430B, through to 1430N representing Rules 1, 2, through to N initiated in step 1425 as CTXTRARs by the CTXTREng. Within each of the Rules 1, 2, through to N the same context element, for example User, may be logically checked against one or more values, such as for example David, Davina, Davidencko representing known users of the device or the context element may be weighted based upon the determination such that David=10, Davina=5, Davidencko=3 so that the presence of David within any rule increases the weighing that context element has within the rule rather than it merely being "1" for a known user and "0" for an unknown user for example. Similarly, weights may also be applied to the different context elements such that, for example, User carries higher weighting that NodeID and both carry higher weighing than Time. It would be evident that other factor calculation means, weighting techniques, etc may be applied to the rule calculations without departing from the scope of the invention.

Accordingly, in step 1435 the results of the multiple CTXTRARs provided to the CTXTREng from the Rules 1 through N derived in steps 1430A through 1430N are collated and errors identified/addressed. The results are then checked in step 1440 to determine whether one or more rule results exceed one or more CTXTREng thresholds, which may apply to all rules or predetermined subsets of the rules. If one or more thresholds are exceeded the process proceeds to step 1445 otherwise to step 1455. In step 1445 a determination of whether a single rule has exceeded a CTX-TREng threshold or not wherein the process proceeds to step 1450 for multiple rule conflict resolution or step 1490 wherein a single rules has been determined wherein the rule will be applied resulting in the determined action with respect to the UI dashboard, dashboard, UI interface, UI interface element(s) and/or dashboard element(s) is completed. For example, a single rule <[User("David")=TRUE; NodeID("01:23:45:67:89:AB")=TRUE]> may result in the device providing the user "David" with his work dashboard as NodeID 01:23:45:67:89:AB is that of the Wi-Fi node to which his PED associates when in the office. Alternatively, 〈[User("Jane")=TRUE; NodeID("01:23:45:67:89:AB")=FALSE; Altitude)">5000")=TRUE]〉 results in the PED determining that the user "Jane" is currently away from her home and office in Denver, Colo. and is within the ski resorts wherein a dashboard she created relating to local weather, ski run conditions, etc. is displayed.

However, in step 1450 multiple rules may have exceeded the threshold and hence a conflict resolution is required in order to determine what rule to apply. For example, the conflict resolution may be as simple as taking the rule with the highest returned rule result, identifying that two rules are similar in result but that one rule has been historically applicable under a predetermined subset of the rule elements, such as for example, location and time/date. Alternatively, weightings applied to common elements within the rules may be adjusted from their initial values within the rules or removed such that a high weighting for David in one rule, but who is common to both rules, is removed from the calculation. Optionally, the user may be provided with a list of contexts to select from where a conflict is identified.

In step 1440 a determination was made as to whether one or more of the rule results exceed one or more CTXTREng thresholds. A negative determination, which indicates poor matching between the current context and the results of the multiple CTXTRARs processed by the CTXTREng, results in the process proceeding to step 1455 wherein the rule results are analysed to ensure that poor matches are not the result of an error from processing a context, for example, as well as to ascertain whether minor modifications to one or more context rules would result in a rule exceeding a threshold. This, together with the results from the multiple CTXTRARs, are fed into process step 1460 wherein the CTXTREng establishes whether from this data a new potential rule is established with a higher analysis result than those currently existing within the multiple CTXTRARs wherein in process step 1470 a determination is made as to whether this new potential rule should be formalized. This determination being performed in conjunction with "Potential" Rule Database 1465 that stores previous potential rules which were not adopted together with their occurrences together with other rule options identified but not adopted. Accordingly, the determination may allow a repetitive context to be identified that does not match existing CTXTRARs established within the CTXTREng. If the determination is that no new rule exists then the process proceeds to step 1475 wherein the rule to apply for determining context is maintained as the current rule and the process then proceeds to step 1490 and applies this rule resulting in the display of its associated contextual UI dashboard.

If the determination is that a new potential rule is identified then the process proceeds to step 1480 wherein a determination is made with respect to notifying the user to the new potential rule. A positive determination results in the process proceeding to step 1485 wherein the user is prompted and may elect to accept the new potential rule or not wherein the process proceeds to either step 1475 if the decision is negative and step 1490 is the decision is positive. A negative determination at step 1480 results in the process proceeding to step 1490 with the new potential rule automatically established as the new applicable rule. It would be evident that the process and/or portions of the process described in respect of FIG. 14 and the CTXTREng may be executed continuously by the device, executed periodically, or upon determination that one or more parameters monitored for context determination have changed. For example, some parameters such as wireless network access point ID and user identity will change in discrete events whereas others such as date, time, and environmental conditions will change in pseudo-continuous manner. Some may change in both manners such as, for example, GPS which will change in pseudo-continuous manner as a user moves but then discretely when the device is turned off and then turned back on.

Within the description above in respect of FIG. 14 the determination of new potential rules is stated as being in conjunction with "Potential" Rule Database 1465 that stores previous potential rules which were not adopted together with their occurrences together with other rule options identified but not adopted. Accordingly, the determination of a new potential rule may include establishing a rule matching a repetitive context that has occurrences meeting a predetermined threshold and/or condition. It would be evident that the new potential rule may be generated to meet the predetermined threshold by associating appropriate weightings to the context factors such that the new potential rule is established as a new context rule.

Within the examples described above the context rules terms were presented as comprising Boolean logic arguments such as NodeID("01:23:45:67:89:AB")=[TRUE: FALSE] to give returned values of [1:0] when the determination is true or false. However, in accordance with some embodiments of the invention such Boolean logic arguments may be combined using a variety of context rule constructions including for example:

$$\langle \text{FactorA} \times \text{FactorB} \times \text{FactorC} \rangle \tag{1}$$

$$\langle (\text{WeightA}*\text{LogicA}) + (\text{WeightB}*\text{LogicB}) + (\text{WeightC}*\text{LogicC}) \rangle \tag{2}$$

$$\langle (\text{WeightA}*\text{FactorA}) + (\text{WeightB}*\text{FactorB}) + (\text{WeightC}*\text{FactorC}) \rangle \tag{3}$$

Accordingly in Equation (1) each factor determination is multiplied so that an overall result is either "0" or "1" when the Factor tests are themselves logical with outcomes of [1:0]. However, in Equation (2) the different logical determinations are each multiplied by a given weighting factor relating to that logical determination such that the result of the context rule may have multiple discrete outputs when the terms LogicA, LogicB, LogicC are "0" or "1." Another option as depicted by Equation (3) is where the terms FactorA, FactorB, FactorC themselves are non-Boolean with linear or non-linear values which are then multiplied by the weighting factors and summed. In this scenario the output of a context rule may have a continuous range of results. Within the description supra in respect of FIG. 13 the embodiment of the invention was described within the context of receiving new context rules with new applications/upgrades/subscription releases. However, it would be evident that alternatively new weightings for one or more context factors may be provided thereby modifying the existing CTXTRARs within the CTXTREng. Similarly, in respect of FIG. 14 the determination of new potential rules may not only include determining new rules or rule factors such as, for example, User("Jane") or GPS(45° 25'15?N75° 41'24?W) but adjusting one or more weightings within one or more context rules. Optionally, a weighting may be reduced to zero thereby removing that factor from consideration until such time that it is amended.

Figure 15:
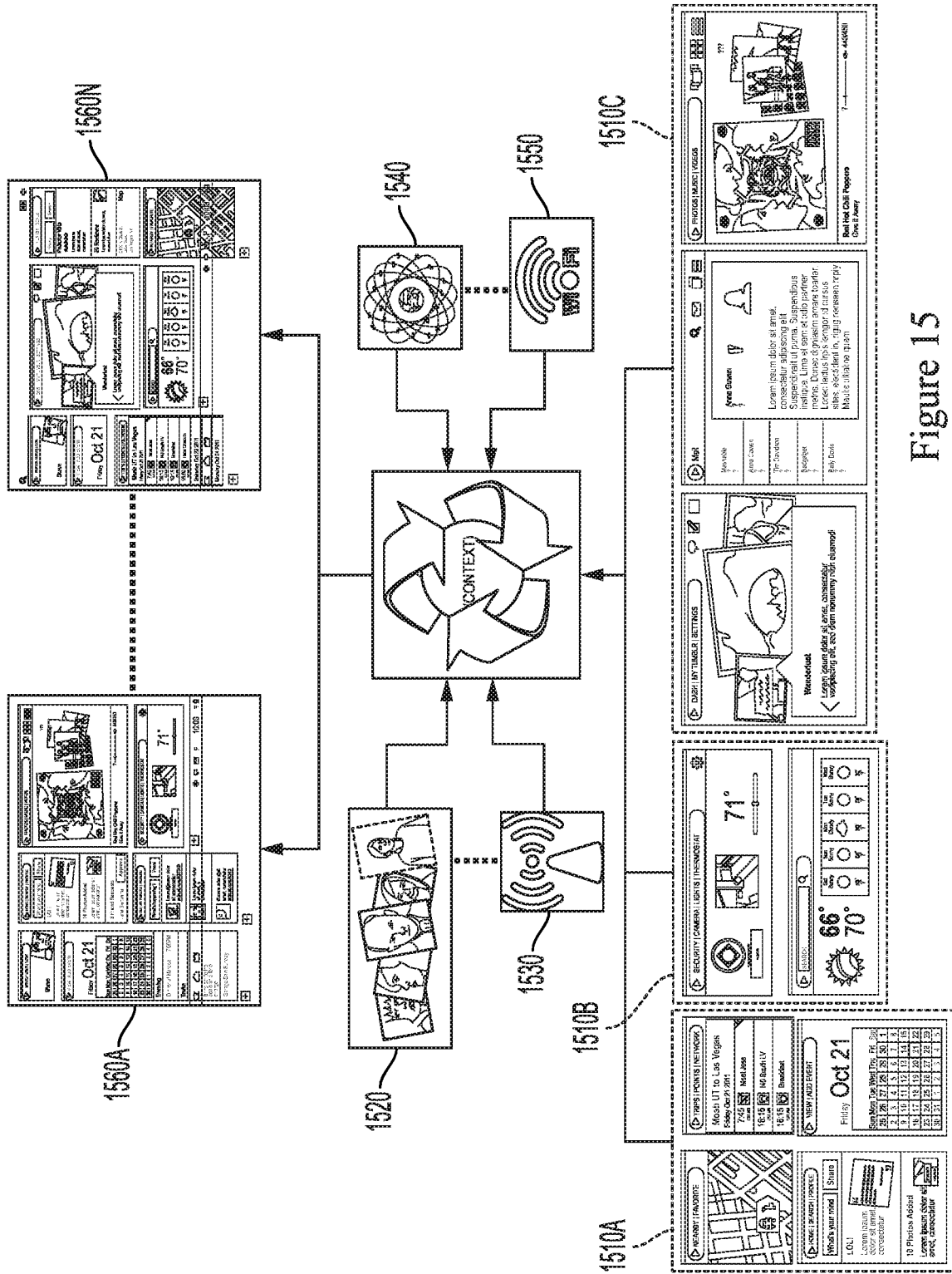
FIG. 15 depicts an exemplary schematic of contextual UI dashboards generated based upon a contextual rule engine determining applications to form part of each contextual UI dashboard.

Now referring to FIG. 15 there is depicted an exemplary schematic of contextual UI dashboards generated based upon a contextual rule engine (CTXTREng) 1570 determining which applications to form part of each contextual UI dashboard. The CTXTREng 1570 may, for example, operate according to a process such as described above in respect of FIG. 14. As depicted in FIG. 15 there are first to third groups of UI dashboard elements 1510A through 1510C respectively which comprise different UI dashboard elements that can form part of UI dashboards as established by a user or users of the device upon which the CTXTREng 1570 is in execution or those automatically configured by one or more applications installed upon the device with the CTXTREng 1570 in execution. Examples of such applications may include, but are not limited to, an operating system, programming software, web browser, enterprise software, accounting software, office suite, graphics software and media player.

CTXTREng 1570 receives inputs from one or more sources including, but not limited to, webcam 1520 identifying a user, GSM card 1530 defining the ID of a cellular node to which the device is connected for cellular service (if available), GPS 1540 defining the location of the device, and WiFi card 1550 defining the ID of a WiFi node to which the device is connected (if service available) for wireless network access. Accordingly, the CTXTREng 1570 based upon one or more CTRXRARs employing one or more of these inputs, and others not shown for clarity, establishes a context and accordingly the UI dashboard to be presented to the user, such as one or other of the first and second UIO dashboard 1560A and 1560B respectively. Accordingly, the operating system in operation upon the device retrieves the appropriate UI dashboard elements from one or more of first to third groups of UI dashboard elements 1510A through 1510C respectively as required to provide the one or other of the first and second UIO dashboard 1560A and 1560B respectively. Accordingly, it would be evident to one skilled in the art that the CTXTREng 1570 may apply one or more CTXTRARs to determine one or more contexts and therefrom one or more UI dashboards which are compiled using one or more dashboard elements. In some instances a UI dashboard element may form part of multiple UI dashboards as a single UI dashboard may be the determined UI interface for multiple contexts established through multiple CTXTRARs.

According to the embodiments of the invention described above in respect of FIGS. 1 through 15 that a user has been stated as registering with a service to remotely access their user customized contextual dashboards. However, it would be evident that this process may be automated such as for example wherein the electronic device performs biometric identification of a user their registration credentials are automatically transmitted to the service. Such a process of biometric identification is described in U.S. Provisional Patent Application 61/584,288 entitled "Method and System for Dynamically Assignable User Interface", the entire contents of which are included by reference. It would also be evident that the transfer of data relating to a user customized UI dashboard may be transferred between electronic devices wherein a network connection may be established between the devices. Such transfer may require the provisioning of credentials relating to the user to authorize the transfer. The presentation and verification of user credentials, passwords, and other security information may also form part of the embodiments presented supra in respect of FIGS. 1 through 15.

It would be evident to one skilled in the art that where a user customized contextual dashboard is transferred to an electronic device other than that associated with the user that the user customized contextual dashboard may be removed from the electronic device once the user has finished or logged out. The removal may be securely executed.

Within embodiments of the invention as described above in respect of FIGS. 1 through 15 that the electronic device has been typically referred to as a portable electronic device (PED). However, it would be evident that these embodiments of the invention may also be employed upon fixed electronic devices. It would be evident to one skilled in the art that the concepts discussed above in respect of contextual dashboards whilst being primarily considered from the viewpoints of tablet computers, smart phones, laptop computers and similar portable electronic devices that the underlying principles may be applied to a wider variety of devices including for example portable gaming consoles, such as Nintendo DS and Sony PSP; portable music players such as Apple iPod, and eReaders such as Kobo, Kindle, and Sony Reader. It would also be evident that whilst the embodiments of the invention have been described with respect to a UI that they may also be employed within software applications that form part of a contextual dashboard or as discrete stand applications in other operating environments such as Windows, Mac OS, Linux and Android for example. For example, a gaming console may similarly establish/disable adult content filters and/or enable/disable Internet access based upon determination of the user discretely or the user with location and the game being played. Whilst the embodiments of the invention have been presented with respect to UI dashboards and UIs in general it would be evident that other embodiments of the invention may through adding/removing elements within such UIs and/or UI dashboards as well as these in their entirety may enable/disable access to software applications/application plug-ins etc. based upon macro- and micro-contexts.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising the steps of:
    (a) executing a context rule engine upon device comprising at least a microprocessor comprising at least a context rule of a plurality of context rules, each context rule determining a user interface to display in dependence the result of applying a context rule meeting a predetermined condition;
    (b) receiving with the microprocessor context data relating to a plurality of factors;
    (c) determining in dependence upon the context data and the plurality of context rules that none of the context rules meet the predetermined condition;
    (d) automatically establishing a new potential rule obtained from a plurality of potential rules in a potential rule database with the context rule engine by varying a predetermined portion of the context rules when none of the context rules meet the predetermined condition;
    (e) determining that the new potential rule is closer to the predetermined condition than the context rules of the plurality of context rules; and
    (f) upon a positive determination in step (e) adding the new potential rule to the plurality of context rules.

2. The method according to claim 1 wherein,
    step (d) comprises trialing the new potential rule by adding a new context factor to each text rule of the predetermined portion of the context rules.

3. The method according to claim 1 wherein step (d) is performed in conjunction with comparing the current context data with previous context data stored within a memory, the previous context data relating; to previous occurrences when none of the context rules met the predetermined condition.

4. The method according to claim 1 further comprising
(g) upon a negative determination in step (e) comparing the current context data with previous context data stored within a memory, the previous context data relating to previous occurrences when none of the context rules met the predetermined condition, and establishing a new context rule based upon the current context data when the comparison of the current context data and the previous context data meets a predetermined criteria.

5. The method according to claim 1, wherein
each context rule comprises a plurality of context factors; and
the context data comprises data relating the plurality of context rules defining for each context rule:
the plurality of context factors;
a plurality of contexts for each context factor of the plurality of context factors; and
a weighting for each context of the plurality of contexts to apply for that context within that context rule.

6. The method according to claim 1, further comprising transferring to a device executing the context rule engine the first data relating, to the application and the second data relating to the context of displaying the application to the user of the device from a remote server via a first network to which the device is connected; wherein
the first data relating to the software application and the second data relating to the context rule were previously transferred to the remote server via a second network from another device.

7. The method according to claim 1 wherein,
step (d) comprises trialing at least one potential context rule by adjusting a weighting applied to a context factor within each context rule of the predetermined portion of the context rules.

8. The method according to claim 1, further comprising
(g) establishing at a first point in time the context rule engine in execution upon the device;
(h) installing an application upon the device at a second point in time after the first point in time comprising first data relating to the application and second data relating to a context of displaying the application to a user of the device; and
(i) modifying the at least one context rule of the plurality of context rules established at the first point in time in dependence upon the second data, installed at the second point in time.

* * * * *